US012253271B2

(12) United States Patent
Beggs et al.

(10) Patent No.: US 12,253,271 B2
(45) Date of Patent: Mar. 18, 2025

(54) METHODS AND APPARATUS TO MONITOR ENVIRONMENTAL CONDITIONS AND REDUCE CONDENSATION

(71) Applicant: Rite-Hite Holding Corporation, Milwaukee, WI (US)

(72) Inventors: Ryan Beggs, Dubuque, IA (US); Steven Hart Campbell, Peosta, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 391 days.

(21) Appl. No.: 17/737,638

(22) Filed: May 5, 2022

(65) Prior Publication Data
US 2022/0357062 A1 Nov. 10, 2022

Related U.S. Application Data

(60) Provisional application No. 63/185,864, filed on May 7, 2021.

(51) Int. Cl.
*F24F 11/00* (2018.01)
*F24F 110/10* (2018.01)
(Continued)

(52) U.S. Cl.
CPC ........ *F24F 11/0001* (2013.01); *G05B 19/042* (2013.01); *F24F 2110/10* (2018.01); *F24F 2110/20* (2018.01); *G05B 2219/2614* (2013.01)

(58) Field of Classification Search
None
See application file for complete search history.

(56) References Cited

U.S. PATENT DOCUMENTS

| 10,982,865 B2 | 4/2021 | Taber et al. |
| 2018/0156524 A1 | 6/2018 | Daimou |
| 2019/0234650 A1 | 8/2019 | D'Souza et al. |

FOREIGN PATENT DOCUMENTS

| JP | H03-7821 | 1/1991 |
| JP | 2015-031415 | 2/2015 |

(Continued)

OTHER PUBLICATIONS

European Patent Office, "Communication pursuant to Rules 161(1) and 162 EPC" in connection with European Patent Application No. 22725617.9, dated Dec. 14, 2023, 3 pages.

(Continued)

*Primary Examiner* — Sean Shechtman
(74) *Attorney, Agent, or Firm* — Hanley, Flight & Zimmerman, LLC

(57) ABSTRACT

Methods and apparatus to monitor environmental conditions and reduce condensation are disclosed. An example apparatus includes a first sensor system to measure a first temperature in a first area and a second sensor system to measure a second temperature in a second area adjacent to the first area. The first area being separated from the second area by a door. A controller has at least one memory, instructions, and processor circuitry to execute the instructions to at least: compare the first temperature and the second temperature; determine if a temperature difference between the first temperature and the second temperature exceeds a temperature threshold; and in response to determining that the temperature difference does not exceed the temperature threshold, deactivate a fan located in the first area.

35 Claims, 11 Drawing Sheets

(51) Int. Cl.
    *F24F 110/20*    (2018.01)
    *G05B 19/042*    (2006.01)

(56) References Cited

FOREIGN PATENT DOCUMENTS

| KR | 10-1177045 | 8/2012 |
|---|---|---|
| KR | 10-2020-0073941 | 6/2020 |

OTHER PUBLICATIONS

International Searching Authority, "International Preliminary Report on Patentability," issued in connection with International Patent Application No. PCT/US2022/027811, issued on Nov. 16, 2023, 9 pages.

International Searching Authority, "International Search Report and Written Opinion," issued in connection with International Patent Application No. PCT/US2022/027811, mailed on Aug. 3, 2022, 15 pages.

Wikipedia, "Infrared thermometer," Aug. 16, 2020, retrieved from Internet at https://en.wikipedia.org/w/index.php?title=Infrared_thermometer&oldid=973300779, on Aug. 21, 2020, 5 pages.

METHODS AND APPARATUS TO MONITOR ENVIRONMENTAL CONDITIONS AND REDUCE CONDENSATION

RELATED APPLICATION(S)

This patent claims priority to U.S. Provisional Patent Application No. 63/185,864, which was filed on May 7, 2021, and which is hereby incorporated herein by reference in its entirety.

FIELD OF THE DISCLOSURE

This disclosure relates generally to doors, and, more particularly, to methods and apparatus to monitor environmental conditions and reduce condensation.

BACKGROUND

Industrial facilities can have indoor areas that can be subject to various environmental conditions. In some instances, environmental conditions can cause unwanted condensation on interior surfaces of the industrial facility.

Figure 1:
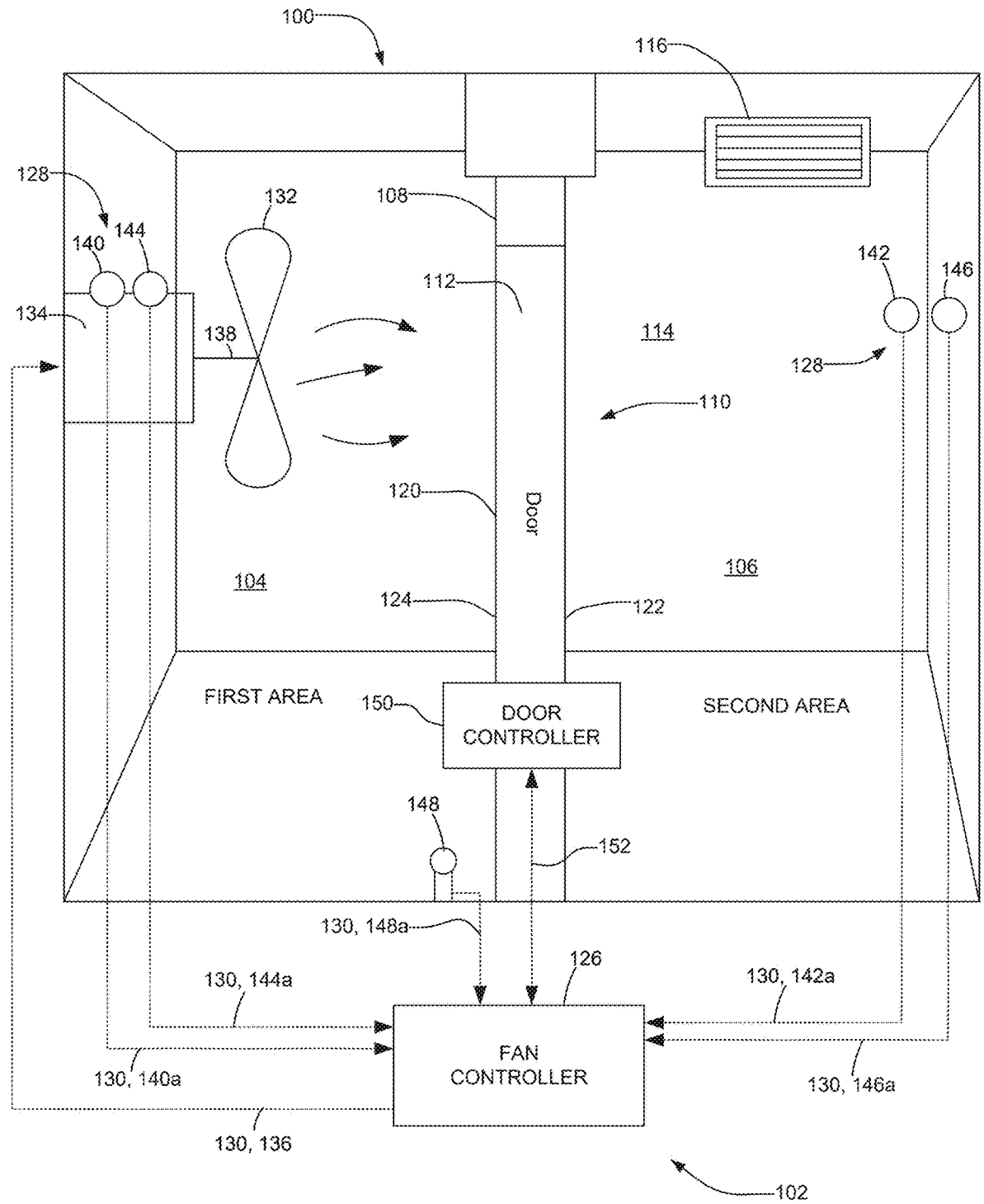
FIG. 1 is an example industrial facility having an example monitoring system constructed in accordance with teachings disclosed herein.

The figures are not necessarily to scale. In general, the same reference numbers will be used throughout the drawing(s) and accompanying written description to refer to the same or like parts. As used herein, connection references (e.g., attached, coupled, connected, and joined) can include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Industrial facilities such as warehouses, material handling facilities, retail spaces, and/or other industrial settings, are often subject to a variety of weather and/or environmental conditions. As a result, variations in environmental conditions can cause unwanted condensation to occur on one or more interior surfaces (e.g., doors, floors, walls, etc.) of the industrial facility. For example, condensation can form on interior surfaces of the industrial facility when the interior surfaces are subject to large temperature differentials. For example, condensation is prone to formation when warmer, moisture-laden air contacts a cooler surface.

As a temperature of air adjacent a surface (e.g., an interior surface) of the industrial facility reduces (e.g., cools), the cooler air can hold less moisture. In turn, condensation, or water, forms on the surface when the air adjacent the surface cools to a temperature e.g., a dewpoint temperature) where the air can no longer hold moisture. Thus, when a temperature of the surface falls below a dewpoint temperature of air in a volume directly exposed to the surface, condensation can form on the surface.

As used herein, dewpoint means a temperature at which water vapor in any static or moving air column will condense into water. In other words, the air is saturated and can no longer hold the moisture at this temperature. When the air temperature drops below its dew point, excess moisture will be released in the form of condensation.

Typically, to reduce or prevent condensation accumulation, industrial facilities employ heating and/or cooling equipment such as air conditioners, heaters, dehumidifiers and/or other equipment. However, such equipment is relatively expensive to install and/or maintain and can significantly increase energy costs of an industrial facility. In some examples, industrial facilities often employ low-cost, low-energy fans. For example, some geographic locations have significant changes (e.g., large changes) in temperature, humidity, dew point temperature, and/or other environmental condition(s) and, thus, fans may not be required during a winter season. For example, a first area can be configured as a freezer and/or cooler that can be kept at a freezing or cool temperature and a second area adjacent the first area that can be kept at room temperature (e.g., a warmer temperature). To reduce and/or eliminate condensation from forming on the door, some known freezer and/or cooler applications often employ fans to provide airflow across the door. However, such known defrost fans typically operate continuously (e.g., 24 hours a day, seven days a week) even during environmental conditions in which the defrost fans may not be needed (e.g., during summer seasons). Operating fans during conditions that are not prone to condensation formation significantly increases energy waste and, thus, operating costs of an industrial facility. Furthermore, operating fans continuously can result in warm (e.g., room temperature) air in the warmer room being blown into the cooler room when the door between the rooms is opened, thereby reducing the efficiency at which the cooler room is maintained at the room's cooler temperature.

Examples disclosed herein employ control systems to monitor environmental conditions and determine whether an interior surface (e.g., a door, a wall, a floor, etc.) can be prone to frost and/or condensation when exposed to certain environmental conditions. In particular, industrial dividers and/or doors are used to separate an area into two or more smaller areas and/or to separate an interior area from an exterior area. For example, some warehouses, retail areas, etc., employ industrial doors to separate a freezer (e.g., having temperatures at or below freezing or 32 degrees Fahrenheit (° F.)) and a warmer or room temperature area (e.g., having temperatures above freezing or greater than 32° F.). Example control systems disclosed herein operate one or more fans during conditions that can cause condensation formation on interior surfaces (e.g., doors, dividers, floors, etc.) and deactivate the one or more fans during conditions that may not cause condensation formation on the interior surfaces. Further, in some disclosed examples, fans are shut off when a door between rooms maintained at different temperatures are opened to reduce the forced exchange of air between the two rooms. In this manner, example control systems disclosed herein reduce energy waste and/or reduce operating costs.

FIG. 1 illustrates an example industrial facility 100 having an example monitoring system 102 constructed in accordance with teachings of this disclosure. The industrial facility 100 of the illustrated example includes a first area 104 (e.g., a first room) and a second area 106 (e.g., a second room) adjacent the first area 104. A divider 108 (e.g., a wall) separates the first area 104 and the second area 106. To selectively block and unblock a passageway 110 between the first area 104 and the second area 106, the divider 108 of the illustrated example includes a door 112. The door 112 of the illustrated example is movable between a closed position to prevent access between the first area 104 and the second area 106 and an open position to allow access between the first area 104 and the second area 106. The door 112 of the illustrated example includes insulation (e.g., having an insulation R-value, for example, between R-13 and R-21) to reduce (e.g., minimize) heat transfer between the first area 104 and the second area 106. Examples of doors that can implement the example door 112 of FIG. 1 include, but are not limited to, a power-operated door, a rollup panel (e.g., pliable or flexible sheet), a rigid panel, a flexible panel, a pliable panel, a vertically translating panel, a horizontally translating panel, a panel that translates and tilts, a swinging panel, a segmented articulated panel, a panel with multiple folding segments, a multilayer thermally insulated panel, and/or various combinations thereof and/or any other suitable door or door panel and/or a plurality of door panels for selectively blocking and unblocking access between the first area 104 and the second area 106.

In the illustrated example, the first area 104 and the second area 106 are maintained at different temperatures. For example, the first area 104 can have a first temperature that can be generally greater than a second temperature of the second area 106. For example, the first area 104 of the illustrated example is configured to have ambient room temperature conditions and the second area 106 of the illustrated example is configured to have freezing temperature conditions. For example, the second area 106 of the illustrated example is configured as a freezer 114. For example, the freezer 114 can include a refrigeration unit 116 to maintain and/or adjust the second temperature of the second area 106 within a freezer temperature range (e.g., between 32 degrees Fahrenheit and 0 degrees Fahrenheit). In some instances, the second area 106 can be configured as a combination cooler and freezer. For example, in some examples, the refrigeration unit 116 can be set to maintain the second temperature of the second area 106 within the freezer temperature range to store product (e.g., meats, etc.) for a first duration of time (e.g., one month) and subsequently set to maintain the second temperature of the second area 106 within a refrigerator temperature range to defrost the product for a second duration of time (e.g., two days) prior to using (e.g., shipping or selling) the product stored in the second area 106.

In some examples, the first area 104 can be configured as a cooler having a refrigeration unit (e.g., the refrigeration unit 116 and/or a different refrigeration unit) to maintain and/or adjust the first temperature within a refrigerator temperature range (e.g., between 33 degrees Fahrenheit and 65 degrees Fahrenheit). In some examples, the first area 104 and the second area 106 can be configured as dual coolers. For example, the first area 104 can be configured as a first cooler having a first refrigeration unit (e.g., the refrigeration unit 116) to maintain the first temperature of the first area 104 within a refrigerator temperature range (e.g., between 33 degrees Fahrenheit and 65 degrees Fahrenheit) and the second area 106 can be configured as a cooler (e.g., via the refrigeration unit 116) to maintain the second temperature of the second area 106 within a refrigerator temperature range (e.g., between 33 degrees Fahrenheit and 65 degrees Fahrenheit).

Due to different temperatures between the first area 104 and the second area 106, the divider 108 and/or the door 112 (and/or other interior surfaces) of the illustrated example can be exposed to potential (e.g., significant) temperature differentials. Specifically, a first side 120 (e.g., a first panel) of the door 112 and a second side 122 (e.g., a second panel) of the door 112 can be exposed to different temperatures contemporaneously. For example, the first side 120 of the door 112 oriented toward the first area 104 can be exposed to the first temperature (e.g., an ambient/room temperature) and the second side 122 of the door 112 opposite the first side 120 and oriented toward the second area 106 can be exposed to the second temperature (e.g., a freezing temperature at or below 32 degrees Fahrenheit). A temperature differential across the door 112 can cause condensation to form on the door 112 and/or in the first area 104 during certain environmental conditions in the first area 104 and/or the second area 106. In particular, condensation can form on a warmer temperature side of the door 112 (e.g., the first side 120) when a surface temperature of the door 112 exposed to the warmer temperature side falls below a dewpoint of an area (e.g., the first area) having the warmer temperature. In other words, condensation can form on the door 112 when a surface 124 of the door 112 is at or below a dewpoint of a current environment where the door 112 is mounted or located. In the illustrated example, condensation can form on the first side 120 of the door 112 in instances where the first temperature of the first area 104 is greater than the second temperature of the second area 106 and at least one of: (1) a difference between a first dewpoint of the first area and a second dewpoint of the second area is greater than a dewpoint threshold; (2) the first temperature is less than the second dewpoint; or (3) a surface temperature of the first side 120 of the door 112 is less than the first dewpoint.

To detect environmental conditions that can cause condensation to form on interior surfaces of the industrial facility 100, the industrial facility 100 of the illustrated example includes the monitoring system 102. For example, to reduce or prevent condensation from forming on the surface 124 of the door 112, the monitoring system 102 of the illustrated example monitors one or more environmental conditions of the first area 104 and the second area 106, including, but not limited to, temperatures, relative humidity, dewpoints, and surface temperatures. For example, to detect environmental conditions that can cause condensation formation on the door 112, the monitoring system 102 of the illustrated example monitors and/or determines the first temperature, the first relative humidity, and the first dewpoint of the first area, the second temperature, the second relative humidity, and the second dewpoint of the second area, and the surface temperature of the first side 120 of the door 112. In some examples, the monitoring system 102 can be configured to measure or determine any other suitable environmental condition(s) such as, for example, weather patterns, etc.

The monitoring system 102 of the illustrated example includes a fan controller 126 and includes one or more sensor(s) 128 that provide one or more signal(s) 130 for interpretation and/or processing by the monitoring system 102 to detect an environmental condition for operating a fan 132 or detect an environmental condition for deactivating the fan 132. In other words, the fan controller 126 operates the fan 132 based on data (e.g., the signal(s) 130) provided by the sensor(s) 128. Additionally or alternatively, in some examples, the fan 132 is activated and/or deactivated based on a status (e.g., open, opening, closed, closing, etc.) of the door 112 towards which and/or adjacent to which the fan 132 is positioned to blow air. The fan controller 126 of the illustrated example can operate the fan 132 between an activated mode and a deactivated mode and/or can vary (e.g., increase or decrease) a rotational speed of the fan 132 when the fan 132 is in the activated mode. For example, the fan controller 126 is communicatively coupled to a motor 134 associated with the fan 132 and controls operation (e.g., activation and/or a speed) of the motor 134 via an output signal 136. In some examples, a drive unit of the fan 132 can provide data or a feedback signal to the fan controller 126 to indicate the status of the motor 134 and/or associated components (e.g., rotational speed, current draw, rotational position (e.g., indicated by an encoder), etc.). In some examples, the fan controller 126 is remote from the sensor(s) 128, the first area 104 and/or the industrial facility 100, and may receive the signal(s) 130 from the sensor(s) 128 and/or send one or more command signals (e.g., the output signal 136) via a wireless network (e.g., a Wi-Fi network, a Bluetooth, etc.).

In the illustrated example, the monitoring system 102 of the illustrated example includes a first temperature sensor 140 to measure a first temperature of the first area 104 and a second temperature sensor 142 to measure a second temperature of the second area 106. For example, the first temperature sensor 140 of the illustrated example measures a dry-bulb temperature of the first area 104 and provides a feedback signal 140*a* to the fan controller 126 representative of the measured first temperature, and the second temperature sensor 142 of the illustrated example measures a dry-bulb temperature of the second area 106 and provides a feedback signal 142*a* to the fan controller 126 representative of the measured second temperature. Additionally, the monitoring system 102 of the illustrated example includes a first relative humidity sensor 144 to measure a first relative humidity of the first area 104 and a second relative humidity sensor 146 to measure a second relative humidity of the second area 106. The first relative humidity sensor 144 of the illustrated example provides a feedback signal 144*a* representative of the measured first relative humidity and the second relative humidity sensor 146 of the illustrated example provides a feedback signal 146*a* representative of the measured second relative humidity.

In some examples, the humidity sensors 144, 146 can be configured to measure relative humidity for any temperature. In other words, the humidity sensor 144, 146 is not limited or restricted to measuring relative humidity based on a temperature of the first area 104 or the second area 106, respectively. Thus, the humidity sensor 144, 146 can be configured to measure relative humidity when the air temperature is at any temperature.

In some examples, the humidity sensor 144, 146 can be configured to measure relative humidity when air temperature in the respective first area 104 or the second area 106 is above a predefined temperature value (e.g., air temperatures that exceed 32 degrees Fahrenheit (e.g., above freezing temperatures)). For air temperatures that do not exceed the predefined temperature value (e.g., air temperatures are less than or equal to 32 degrees (e.g., below freezing temperatures), the system 102, 202 (FIG. 2) receive an estimated relative humidity. For example, the fan controller 126 can obtain, retrieve and/or receive an estimated relative humidity when air temperature of the first area 104 and/or the second area 106 do not exceed the pre-defined temperature value. For example, the estimated relative humidity can be provided in a database (e.g., as a look-up table). In some examples for which air temperature is below the predefined temperature value (e.g., air temperature is at or below freezing temperature), a default relative humidity of ninety percent, ninety-five percent, and/or any other relative humidity value can be provided for any temperature below the predefined temperature value. In some examples, for temperatures below the predefined temperature value, each temperature and/or a specific temperature range can have a corresponding estimated relative humidity. In some examples, only a single estimated relative humidity value is provided for all temperatures that do not exceed the pre-defined temperature value. Fan controller 126 of the illustrated example determines (e.g., calculates) a first dewpoint of the first area 104, a second dewpoint of the second area 106 and a surface temperature of the door 112 (e.g., the surface 124 of the first side 120 of the door 112) based on inputs (e.g., the signal(s) 130) received from the first temperature sensor 140, the first relative humidity sensor 144, the second temperature sensor 142 and the second relative humidity sensor 146.

Alternatively, the monitoring system 102 can include a sensor (e.g., a dewpoint meter, a dewpoint thermometer, etc.) to detect or measure a first dewpoint of the first area 104 and/or a second dewpoint of the second area 206. For example, the monitoring system 102 can include a first dewpoint sensor to measure a first dewpoint of the first area 104 that provides a feedback signal to the fan controller 126 representative of a measured first dewpoint of the first area 104 and/or a second dewpoint sensor to measure a second dewpoint of the second area 106 that provides a feedback signal to the fan controller 126 representative of a measured second dewpoint of the second area 106. For example, the first dewpoint sensor can replace the first relative humidity sensor 144 and the second dewpoint sensor can replace the second relative humidity sensor 146. In turn, the fan controller 126 can be configured to calculate the first relative humidity of the first area 104 and/or a second relative humidity of the second area 106 based on the first temperature, the first dewpoint, the second temperature and/or the second dewpoint. In some examples, the monitoring system 102 can include the first temperature sensor 140, the first relative humidity sensor 144 and a first dewpoint sensor to measure the first temperature, the first relative humidity and the first dewpoint of the first area 104, respectively. Likewise, in some examples, the monitoring system 102 can include the second temperature sensor 142, the second relative humidity sensor 146 and a second dewpoint sensor to measure the second temperature, the second relative humidity and the second dewpoint of the second area 106, respectively.

Additionally, to determine the surface temperature of the door 112, the monitoring system 102 of the illustrated example determines (e.g., calculates) the surface temperature of the door 112 based on the first temperature, the first relative humidity, the second temperature and/or the second relative humidity. However, in some examples, the monitoring system 102 can include a surface temperature sensor 148 (e.g., an infrared temperature sensor directed at the surface 124 of the door 112) that provides a feedback signal 148a to the fan controller 126 representative of a surface temperature of the door 112.

To reduce or prevent condensation formation during certain environmental conditions detected by the monitoring system 102, the monitoring system 102 of the illustrated example includes the fan 132. The fan 132 of the illustrated example provides airflow across the first side 120 of the door 112 to reduce or eliminate condensation formation on the first side 120 of the door 112. The airflow provided by the fan 132 displaces cooler air adjacent the surface 124 of the door 112 to reduce formation of condensation. In some examples, the airflow enables warmer temperature air (e.g., air having the first temperature) to flow adjacent the surface 124 of the door 112 to increase a surface temperature of the surface 124 and, thus, reduce or prevent condensation. In some instances, the airflow provided by the fan 132 can dry condensation that forms on the surface 124 of the door 112 quicker compared to an area of an industrial facility that does not include the fan 132.

In operation, to selectively operate the fan 132 during certain environmental conditions detected by the fan controller 126 that can cause condensation to form on the door 112, the monitoring system 102 of the illustrated example commands operation the fan 132 via the output signal 136 based on the signal(s) 130 received from the sensor(s) 128. For example, the monitoring system 102 of the illustrated example operates the fan 132 based on the first temperature obtained by the first temperature sensor 140, the first relative humidity obtained by the first relative humidity sensor 144, the second temperature obtained by the second temperature sensor 142, the second relative humidity obtained by the second relative humidity sensor 146, a calculated first dewpoint of the first area 104, a calculated second dewpoint of the second area 106 and a calculated surface temperature of the door 112 (e.g., the first side 120 of the door 112).

As a result, the monitoring system 102 of the illustrated example activates operation of the fan 132 during environmental conditions that can cause condensation formation and deactivates operation of the fan 132 during environmental conditions that do not present a risk of condensation formation. For example, some geographic locations have significant changes (e.g., large changes) in temperature, humidity, dew point temperature, and/or other environmental condition(s) and, thus, defrost fans may not be required during certain environmental conditions (e.g., a winter season). Operating the fan 132 only during conditions in which the fan is needed significantly decreases energy waste and, thus, operating costs.

In some examples, the door 112 is an automatic door that is operated and/or controlled by an example door controller 150. More particularly, in some examples, the door 112 can a vertically translating door, a horizontally translating door, a roll-up door, and/or any other suitable type of automatic door that can be mechanically actuated to move between open and closed positioned. In some examples, the door controller 150 is accessible on both sides of the door 112. In some examples, the door controller 150 is only accessible on one side of the door 112. In some examples, a separate door controller 150 is positioned on either side of the door. In some examples, the door controller 150 causes the door 112 to open in response to a signal from a sensor detecting approaching traffic. In some examples, the signal is based on feedback from one or motion or presence sensors monitoring the area adjacent to the door 112. Additionally or alternatively, in some examples, the signal is generated by a user entering a command via a user interface associated with the door controller 150.

As represented in the illustrated example of FIG. 1, the door controller 150 is separate from and in communication with the fan controller 126. In some examples, the fan controller 126 and the door controller 150 are integrated into a single controller. In some examples, the door controller 150 transmits or provides a status signal 152 to the fan controller 126 indicating a status of the door 112. For instance, in response to detecting a signal indicating the door 112 is to be opened, the door controller 150 transmits the status signal 152 to the fan controller to indicate the door is opening. In some examples, the status signal 152 indicates an impending change in the status of the door. For instance, in some examples, the status signal 152 indicates the door is about to open. In some examples, instead of the door controller 150 providing the status signal 152 to the fan controller 126, the signals from the sensors (e.g., motion sensors, presence sensors, etc.) used by the door controller 150 to determine when to open the door 112 (or otherwise change the status of the door 112) are provided directly to the fan controller 126. In such examples, the fan controller 126 determines when the door 112 is to open and close (or otherwise change status) independent of the door controller 150.

In some examples, the fan controller 126 deactivates the fan 132 whenever the door is at least partially open to reduce the amount of warm air in the first area 104 being blown into the cooler second area 106. Deactivating the fan 132 may not cause the fan 132 to stop spinning immediately due to the momentum of the fan 132. Accordingly, in some examples, there is a time delay between when it is determined that the door 112 is to be opened and when the door 112 begins opening. In some examples, the fan controller 132 deactivates the fan 132 as soon as it is determined that the door is to be opened to allow the fan 132 to slow down during the time delay before the door 112 is actually opened. Additionally or alternatively, in some examples, the fan controller 126 activates a brake coupled to the fan 132 and/or the associated motor 134 to cause the fan 132 to stop spinning relatively quickly in response to receipt of the status signal 152 indicating the door 112 is open. In response to the status signal 152 indicating the door 112 has returned to a closed position, the fan controller 126 may cause the fan 132 to turn on again as needed (e.g., based on measurements of temperature, humidity, and dewpoint as discussed above).

Figure 2:
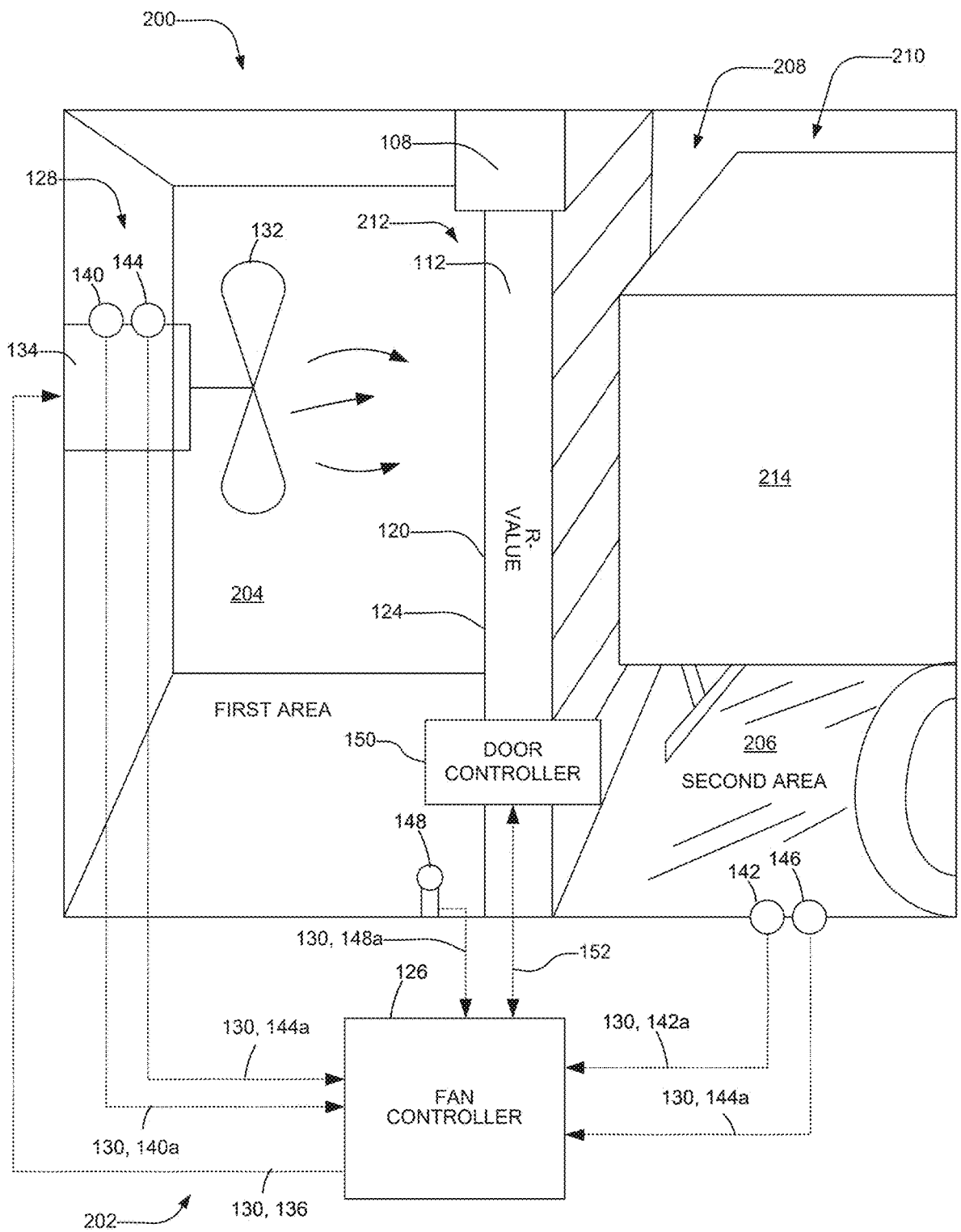
FIG. 2 is another example industrial facility having another example monitoring system disclosed herein.

FIG. 2 is another example industrial facility 200 that includes another example monitoring system 202 disclosed herein. Those components of the example industrial facility 200 of FIG. 2 that are substantially similar or identical to the components of the industrial facility 100 described above and that have functions substantially similar or identical to the functions of those components will not be described in detail again below. Instead, the interested reader is referred to the above corresponding descriptions. To facilitate this process, similar reference numbers will be used for like structures. For example, the industrial facility 200 of the illustrated examples includes the monitoring system 202 having, a door 112, a fan controller 126, a fan 132, a motor 134, a first temperature sensor 140, a first relative humidity sensor 144, a second temperature sensor 142, and a second relative humidity sensor 146.

The industrial facility 200 includes the first area 204 and a second area 206. The second area 206 is an exterior area 208 of the industrial facility 200 such as, for example, a loading dock 210. A doorway 212 enables access between a vehicle 214 located at the loading dock 210 and an interior 216 of the industrial facility 200 defined by the first area 204.

The monitoring system 202 of the illustrated example includes the fan controller 126 that receives the signal(s) 130 for interpretation and/or processing by the monitoring system 202 to detect an environmental condition for selectively operating the fan 132. In other words, the fan controller 126 operates the fan 132 based on the signal(s) 130.

Alternatively, the fan controller 126 of the illustrated example can be configured to receive environmental conditions (e.g., temperature, relative humidity, dewpoint, etc.) of the second area 206 (e.g., an outdoor environment) from a third-party source (e.g., National Oceanic and Atmospheric Administration National Weather Service). For example, the fan controller 126 can be communicatively coupled to the third-party source via a wireless network (e.g., a Wi-Fi network, a Bluetooth, a cellular network, a satellite network, etc.) to receive environmental conditions (e.g., temperature, relative humidity, dewpoint, etc.) of the second area 206. For example, the fan controller 126 receives a second temperature (e.g., a dry-bulb temperature) of the second area 206, a second relative humidity of the second area 206, and/or a second dewpoint of the second area 206. For example, the fan controller 126 can employ a location sensor (e.g., a GPS sensor) to receive environmental conditions of the second area 206 based on a geographic location of the second area 206. In some such examples, the monitoring system 202 of the illustrated example does not include the second temperature sensor 142 and the second relative humidity sensor 146.

Given certain geographic locations, a second temperature of the second area 206 can be less than the first temperature of the first area 204 and other environmental conditions can exist that can cause condensation formation on a first side 120 of a door 112 oriented toward the first area 204. For example, some geographic locations have significant changes (e.g., large changes) in temperature, humidity, dewpoint, and/or other environmental condition(s) and, thus, the fan 132 may be required during some seasons (e.g., spring and fall) and may not be required during other seasons (e.g., winter, summer, etc.). The monitoring system 202 of FIG. 2 functions substantially similar to the monitoring system 102 of FIG. 1 to selectively operate the fan 132 to reduce or prevent condensation during certain detected environmental conditions and deactivate the fan 132 when detected environmental conditions do not cause condensation on the surface 124 of the door 112.

Figure 3:
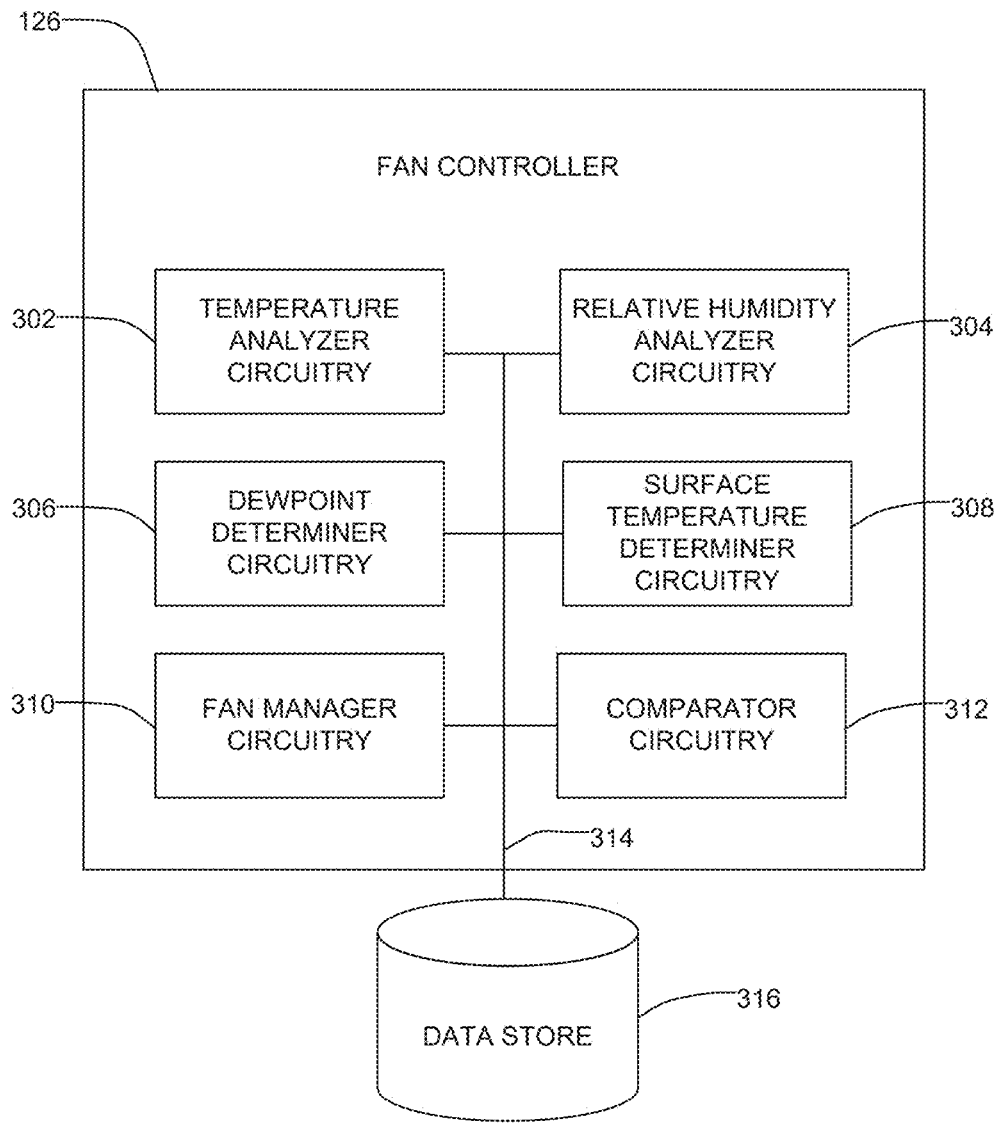
FIG. 3 is a block diagram of an example fan controller of the example monitoring systems of FIGS. 1 and/or 2.

FIG. 3 is a schematic illustration of the fan controller 126 of the example monitoring systems 102, 202 of FIGS. 1 and/or 2. The fan controller 126 of FIG. 3 may be instantiated (e.g., creating an instance of, bring into being for any length of time, materialize, implement, etc.) by processor circuitry such as a central processing unit executing instructions. Additionally or alternatively, the fan controller 126 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor. The fan controller 126 of the illustrated example includes example temperature analyzer circuitry 302, example relative humidity analyzer circuitry 304, example dewpoint determiner circuitry 306, example surface temperature determiner circuitry 308, example fan manager circuitry 310, and example comparator circuitry 312, which are communicatively connected with an example communication bus 314. The fan controller 126 is communicatively coupled to a data store 316.

The temperature analyzer circuitry 302 of the illustrated example receives, obtains and/or analyzes data (e.g., from the signal(s) 130) to detect a first temperature of the first area 104, 204 and a second temperature of the second area 106, 206. For example, the temperature analyzer circuitry 302 of the illustrated example receives, obtains and/or analyzes data (e.g., the feedback signal 140a) emitted or captured by the first temperature sensor 140 to detect a first temperature of the first area 104 and/or receives, obtains and/or analyzes data (e.g., the feedback signal 142a) emitted or captured by the second temperature sensor 142 to detect a second temperature of the second area 106. Alternatively, the temperature analyzer circuitry 302 of the illustrated example can receive a temperature signal from the network representative of the second temperature of the second area 206. The feedback signal 140a and/or the feedback signal 142a (and/or the temperature signal from the network) can be a digital signal, an analog signal, a voltage value, a current value, and/or any other type of signal representative of a measured temperature. In some examples where the temperature data includes analog data, the temperature analyzer circuitry 302 includes an analog-to-digital converter to convert the analog data to a digital data.

In some examples, the temperature analyzer circuitry 302 of the illustrated example determines if the measured first temperature of the first area 104, 204 is greater than the measured second temperature of the second area 106, 206. For example, the temperature analyzer circuitry 302 compares, via a comparator circuitry 312, the feedback signal 140a associated with the first temperature sensor 140 and the feedback signal 142a associated with the second temperature sensor 142 to determine if the measured first temperature of the first area 104, 204 is greater than the measured second temperature of the second area 106, 206. In some examples, if the temperature analyzer circuitry 302 determines that the first temperature does not exceed the second temperature, the fan manager circuitry 310 can command the fan 132 to deactivate. In some examples, if the temperature analyzer circuitry 302 determines that the first temperature exceeds the second temperature, the fan controller 126 analyzes other environmental conditions (e.g., relative humidity, surface temperature, dewpoint, etc.) to determine whether the fan manager circuitry 310 should activate the fan 132. In some examples, the fan manager circuitry 310 is instantiated by processor circuitry executing fan manager instructions and/or configured to perform operations such as those represented by the flowcharts of FIGS. 4-7.

The example relative humidity analyzer circuitry 304 of the illustrated example receives, accesses and/or analyzes relative humidity data of the first area 104, 204 and the second area 106, 206. For example, the relative humidity analyzer circuitry 304 of the illustrated example receives, accesses and/or analyzers a signal (e.g., the feedback signal 144a) associated with the first relative humidity sensor 144 to detect a measured relative humidity of the first area 104, 204 and/or a signal (e.g., the feedback signal 146a) associated with the second relative humidity sensor 146 to detect a measured relative humidity of the second area 106, 206. Alternatively, the relative humidity analyzer circuitry 304 can receive, access and/or analyze the relative humidity signal from the network representative of the second relative humidity of the second area 206.

In some examples, the relative humidity analyzer circuitry 304 can obtain estimated relative humidity values that can be stored, for example, in the data store 316. For example, the relative humidity analyzer circuitry 304 can obtain an estimated humidity value that correlates with a temperature value provided by the temperature analyzer circuitry 302. For instance, in the example of FIGS. 1 and 2, the humidity sensors 144, 146 can be configured to measure relative humidity for temperatures that are greater than a predefined temperature value (e.g., above freezing and/or greater than 32 degrees Fahrenheit). For temperatures that do not exceed (e.g., are equal to or less than) the predefined temperature value, the relative humidity analyzer circuitry 304 obtains an estimated relative humidity value (e.g., from a look-up table stored in the data store 316). In some examples, the look-up table includes a listing of estimated humidity values that correlate with respective temperatures that do not exceed the predefined temperature value. In some examples, the look-up table includes an estimated relative humidity value (e.g., a single value) for all temperature values that do not exceed the predefined temperature value. In some examples, the look-up table includes a listing of different temperature ranges and each temperature range includes a corresponding estimated relative humidity value. Of course, when the humidity sensors 144, 146 are configured to measure relative humidity at any temperature (i.e., at temperatures above and below the predefined temperature value), the estimated relative humidity values can be omitted.

The feedback signal 144a can be a digital signal, an analog signal, a voltage value, a current value, and/or any other type of signal representative of a measured relative humidity of the first area 104, 204. Likewise, the feedback signal 146a (and/or the relative humidity signal from a network) can be a digital signal, an analog signal, a voltage value, a current value, and/or any other type of signal representative of a measured relative humidity of the second area 106, 206. In some examples where the relative humidity data includes analog data, the relative humidity analyzer circuitry 304 includes an analog-to-digital converter to convert the analog data to a digital data. In some examples, the relative humidity analyzer circuitry 304 is instantiated by processor circuitry executing relative humidity analyzer instructions and/or configured to perform operations such as those represented by the flowcharts of FIGS. 4-7.

The dewpoint determiner circuitry 306 of the illustrated example determines or calculates a first dewpoint of the first area 104, 204 and/or a second dewpoint of the second area 106, 206. For example, to calculate the first dewpoint of the first area 104, 204, the dewpoint determiner circuitry retrieves, obtains and/or analyzes the measured first temperature of the first area 104, 204 provided by the temperature analyzer circuitry 302 and the measured first relative humidity of the first area 104, 204 provided by the relative humidity analyzer circuitry 304. Similarly, to calculate the second dewpoint of the second area 106, 206, the dewpoint determiner circuitry 306 retrieves, obtains and/or analyzes the measured second temperature of the second area 106, 206 provided by the temperature analyzer circuitry 302 and the measured second relative humidity of the second area 106, 206 provided by the relative humidity analyzer circuitry 304.

The dewpoint determiner circuitry 306 can employ any one of the following equations to determine or calculate the first dewpoint of the first area 104, 204 and/or the second dewpoint of the second area 106, 206. For example, the dewpoint can be calculated using one of the following equations obtained from 2009 ASHRAE Handbook-Fundamentals 1.13 (Eq. 39), published 2009, by the American Society of Heating, Refrigerating and Air-Conditioning Engineers, Inc.:

$$t_d = C_{14} + C_{15}\alpha + C_{16}\alpha^2 + C_{17}\alpha^3 + C_{18}(p_{water})^{0.1984} \text{ for } t \geq 32° \text{ F. and } <200° \text{ F.} \quad \text{EQ1:}$$

$$t_d = 90.12 + 26.142\alpha + 0.8927\alpha^2 \text{ for } t \leq 32° \text{ F., where} \quad \text{EQ2:}$$

$C_{14} = 100.45$; $C_{15} = 33.193$; $C_{16} = 2.319$; $C_{17} = 0.17074$; $C_{18} = 1.2063$; and where:

$\alpha = \ln(p_{water})$, where ln is the natural logarithm based on Euler's constant, and $(p_{water})$ is a partial pressure of water. The partial pressure of water can be calculated by the following equation: EQ3:

$(p_{water}) = (RH/100\%) * p_{vapor}$; where $(p_{water})$ is the partial pressure of water, RH is the measured first relative humidity and $p_{vapor}$ is the saturation vapor pressure of water at a measured temperature. EQ4:

The dewpoint determiner circuitry 306 of the illustrated example receives, retrieves or obtains a saturation vapor pressure from the data store 316 (e.g., a look-up table) associated with a measured temperature. For example, to calculate the first dewpoint, the dewpoint determiner circuitry 306 receives, obtains or analyzes the measured first temperature of the first area 104, 204 from the temperature analyzer circuitry 302 and retrieves, obtains or accesses the saturation vapor pressure $(p_{vapor})$ corresponding to the measured first temperature of the first area 104, 204 from a look-up table stored in the data store 316. Additionally, the dewpoint determiner circuitry 306 retrieves, obtains or accesses the measured first relative humidity from the relative humidity analyzer circuitry 304. With the measured first relative humidity and the saturation vapor pressure $(p_{vapor})$ associated with the measured first temperature of the first area 104, 204, the dewpoint determiner circuitry 306 calculates the partial pressure of water $(p_{water})$ using equation 4 noted above. After calculating the partial pressure of water $(p_{water})$ for the measured first temperature and the measured first relative humidity of the first area 104, 204, the dewpoint determiner circuitry 306 calculates a variable alpha (a) using equation 3 noted above.

To determine the first dewpoint of the first area 104, 204, the dewpoint determiner circuitry 306 of the illustrated example employs equation 1 when the measured first temperature of the first area 104 is greater than or equal to a temperature threshold (e.g., 32° F.) or equation 2 when the measured first temperature of the first area 104 is less than the temperature threshold (e.g., 32° F.). For example, to determine if the measured first temperature of the first area 104 exceeds the temperature threshold, the dewpoint determiner circuitry 306 compares, via the comparator circuitry 312, the measured first temperature of the first area 104, 204 provided by the temperature analyzer circuitry 302 and the temperature threshold via the comparator circuitry 312. In some examples, the comparator circuitry 312 is instantiated by processor circuitry executing comparator instructions and/or configured to perform operations such as those represented by the flowcharts of FIGS. 4-7.

Similarly, to calculate the second dewpoint of the second area 106, 206, the dewpoint determiner circuitry 306 receives, obtains or analyzes the measured second temperature of the second area 106, 206 from the temperature analyzer circuitry 302 and retrieves, obtains or analyzes the vapor pressure corresponding to the measured second temperature of the second area 106, 206 from a look-up table stored in the data store 316. Additionally, the dewpoint determiner circuitry 306 receives, retrieves or obtains the measured second relative humidity of the second area 106, 206 from the relative humidity analyzer circuitry 304. After obtaining the measured second relative humidity and the saturation vapor pressure associated with the measured second temperature, the dewpoint determiner circuitry 306 calculates the partial pressure of water $(p_{water})$ using equation 4 noted above. After calculating the partial pressure of water $(p_{water})$ for the measured second temperature and the measured second relative humidity of the first area 104, 204, the dewpoint determiner circuitry 306 calculates the variable alpha (a) using equation 3 noted above. To determine or calculate the second dewpoint of the second area 106, 206 the dewpoint determiner circuitry 306 of the illustrated example employs equation 1 when the measured second temperature is greater than or equal to the temperature threshold (e.g., 32° F.) or equation 2 when the measured second temperature is less than the temperature threshold (e.g., 32° F.). Alternatively, the dewpoint determiner circuitry 306 can employ other equations to determine or calculate a dewpoint.

Alternatively, in some examples, the dewpoint determiner circuitry 306 receives, accesses or obtains a first signal from a dewpoint sensor located in the first area 104 representative of a dewpoint of the first area 104 and/or a second signal from a second dewpoint sensor located in the second area 106, 206 representative of a dewpoint of the second area 106, 206 without having to calculate the first dewpoint and/or the second dewpoint (e.g., using equations 1-4 noted above).

Additionally, the dewpoint determiner circuitry 306 of the illustrated example determines a difference between the first dewpoint and the second dewpoint (e.g., a delta dewpoint). For example, the dewpoint determiner circuitry 306 of the illustrated example compares, via the comparator circuitry 312, the delta dewpoint and a dewpoint threshold. For example, the dewpoint threshold can be a dewpoint value, or a dewpoint range stored in the data store 316. The dewpoint determiner circuitry 306 and/or the comparator circuitry 312 can receive, obtain and/or retrieve the dewpoint threshold from the data store 316. For example, in response to the dewpoint determiner circuitry 306 determining that a delta dewpoint exceeds the dewpoint threshold, the dewpoint determiner circuitry 306 can cause the fan manager circuitry 310 to command the fan 132 to activate (e.g., turn on). For example, in response to the dewpoint determiner circuitry 306 determining that a delta dewpoint does not exceed the dewpoint threshold, the dewpoint determiner circuitry 306 can cause the fan manager circuitry 310 to command the fan 132 to deactivate (e.g. turn off). In some examples, the dewpoint determiner circuitry 306 is instantiated by processor circuitry executing dewpoint determiner instructions and/or configured to perform operations such as those represented by the flowcharts of FIGS. 4-7.

The surface temperature determiner circuitry 308 of the illustrated example determines a surface temperature of a surface associated with the industrial facility 100. For example, the surface temperature determiner circuitry 308 of the illustrated example calculates a surface temperature of the surface 124 of the first side 120 of the door 112. To calculate the surface temperature of the surface 124, the surface temperature determiner circuitry 308 of the illustrated example employs the measured first temperature and the measured second temperature from the temperature analyzer circuitry 302 and calculates a temperature adjustment based on the various conditions including, for example, an insulation rating of the door 112 (e.g., an R-value rating), airflow conditions in the first area 104, 204 adjacent the surface 124, and/or any other adjustment parameters. The temperature adjustment of the illustrated example includes one or more constant values. For example, the surface temperature determiner circuitry 308 can retrieve, obtain or access one or more constant values stored in the data store 316 (e.g., via a look-up table). For example, the door constants can be based on the measured first temperature, the measured second temperature, the delta temperature and/or any combination thereof. For example, to determine the surface temperature of the surface 124 of the door 112 (e.g., $t_{door}$), the surface temperature determiner circuitry 308 can employ the following formulas:

$$\Delta t = -|t_1 - t_2| \qquad \text{EQ5:}$$

$$t_{adjustment} = m_{door} * \Delta t + b_{door} \qquad \text{EQ6:}$$

$$t_{door} = t_2 - t_{adjustment} \text{ for } t_1 \leq t_2 \qquad \text{EQ7:}$$

$$t_{door} = t_1 - t_{adjustment} \text{ for } t_2 < t_1 \qquad \text{EQ8:}$$

where $t_1$ is the measured first temperature of the first area 104, 204, $t_2$ is the measured second temperature of the second area 106, 206, $m_{door}$ is a measured door differential temperature slope and $b_{door}$ is a measured door differential temperature offset or intercept.

The door temperature slope value ($m_{door}$) and the door intercept value ($b_{door}$) are door constants based on an insulation rating (R-value) of the door 112 and the measured first temperature, the measured second temperature, the delta temperature and/or any combination thereof. The door temperature slope value ($m_{door}$) and the door intercept value ($b_{door}$) are predetermined and stored in the data store 316.

In operation, the surface temperature determiner circuitry 308 retrieves, obtains or accesses the measured first temperature and the measured second temperature from the temperature analyzer circuitry 302 and determines a delta temperature representative of the difference between the measured first temperature and the measured second temperature. The surface temperature determiner circuitry 308 retrieves, obtains and/or accesses the door temperature slope value ($m_{door}$) and the door intercept value ($b_{door}$) from the data store 316 based on the one or more of the measured first temperature, the measured second temperature and/or the delta temperature. After obtaining the door temperature slope value ($m_{door}$) and the door intercept value ($b_{door}$), the surface temperature determiner circuitry 308 calculates a temperature adjustment (see EQ6). Depending on whether the measured first temperature is less than or equal to the measured second temperature or whether the first temperature is greater than the measured second temperature, the surface temperature determiner circuitry 308 of the illustrated example calculates the surface temperature of the surface 124 of the door 112 using either equation 7 or equation 8 noted above. For instance, if the measured first temperature is greater than the measured second temperature, the surface temperature determiner circuitry 308 of the illustrated example employs equation 8 to calculate the surface temperature of the door 112 by subtracting the adjustment temperature ($t_{adjustment}$) determined from equation 6 from measured first temperature provided by the temperature analyzer circuitry 302. Alternatively, in some examples, the surface temperature determiner circuitry 308 receives, obtains or analyzes the feedback signal 148a from the surface temperature sensor 148 (e.g., an infrared sensor) representative of a surface temperature of the surface 124 of the door 112 when a monitoring system employs the surface temperature sensor 148. In some such examples, the surface temperature determiner circuitry 308 can determine the surface temperature without requiring use of equations 5-8 noted above. In some examples, the surface temperature determiner circuitry 308 is instantiated by processor circuitry executing surface temperature determiner instructions and/or configured to perform operations such as those represented by the flowcharts of FIGS. 4-7.

The fan manager circuitry 310 of the illustrated example commands operation of the fan 132 based on conditions reported by one or more of the temperature analyzer circuitry 302, the relative humidity analyzer circuitry 304, the dewpoint determiner circuitry 306, and/or the surface temperature determiner circuitry 308. For example, the fan manager circuitry 310 can issue a command signal to deactivate operation of the fan 132 in response to: (1) the measured first temperature of the first area 104, 204 not exceeding the measured second temperature of the second area 106, 206; (2) the measured first temperature exceeding the measured second temperature and the first dewpoint of the first area 104, 204 being greater than or equal to the measured second temperature; or (3) the measured first temperature of the first area 104, 204 exceeding the measured second temperature of the second area 106, 206 and the surface temperature of the surface 124 being greater than the first dewpoint of the first area 104, 204. In some examples, the fan manager circuitry 310 can issue a command signal to activate operation of the fan 132 in response to: (1) the measured first temperature of the first area 104, 204 exceeding the measured second temperature of the second area 106, 206; (2) the measured first temperature exceeding the measured second temperature and the first dewpoint of the first area 104, 204 being less than the measured second temperature; or (3) the measured first temperature of the first area 104, 204 exceeding the measured second temperature of the second area 106, 206 and the surface temperature of the surface 124 being less than or equal to the first dewpoint of the first area 104, 204. Some example decisions to generate and issue command signals via the fan manager circuitry 310 are described in connection with the flowcharts of FIGS. 4 and 5.

The fan manager circuitry 310 of the illustrated example issues a command (e.g. the output signal 138) to operate (e.g., activate or deactivate) the motor 134 of the fan 132. In some instances, the fan manager circuitry 310 of the illustrated example issues command signals to the motor 134 to vary or adjust (e.g., increase or decrease) a rotational speed of the fan 132. The command signal (e.g., the output signal 136) provided by the fan manager circuitry 310 can be a binary signal (e.g., with a "1" value representing activation of the fan 132 and a "0" value representing deactivation of the fan 132). In some examples, the command signal can be an analog signal, a voltage signal, a current signal, etc., and/or any type of signal to either turn off and/or turn on the motor 134 and/or vary a speed of the motor 134. In some examples, the fan manager circuitry 310 is instantiated by processor circuitry executing fan manager instructions and/or configured to perform operations such as those represented by the flowcharts of FIGS. 4-7.

The data store 318 of the illustrated example stores (e.g., temporarily or permanently) temperature values (e.g., the measured first temperature, the measured second temperature value, the calculated delta temperature value from the temperature analyzer circuitry 302 and/or the surface temperature, the adjustment temperature, the delta temperature from the surface temperature determiner circuitry 308, etc.), the relative humidity values (e.g., the measured first relative humidity, the measured second relative humidity) from the relative humidity analyzer circuitry 304, dewpoint values (e.g., first dewpoint, the second dewpoint from the dewpoint determiner circuitry 306), threshold values (e.g., temperature threshold, dewpoint threshold), constant values (e.g., the door temperature slope value ($m_{door}$), the door temperature intercept value ($b_{door}$), etc.), command signal(s) (e.g., the output signal 138) issued by the fan manager circuitry 310, and/or any signal associated with one or more of the sensors 128, 140, 142, 144, 146. The data store 316 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory, etc.). The data store 320 can additionally or alternatively be implemented by one or more double data rate (DDR) memories, such as DDR, DDR2, DDR3, mobile DDR (mDDR), etc. The data store 316 can additionally or alternatively be implemented by one or more mass storage devices such as hard disk drive(s), compact disk drive(s) digital versatile disk drive(s), etc. While, in the illustrated example, the data store 316 is illustrated as a single database, the data store 316 can be implemented by any number and/or type(s) of databases. Furthermore, the data stored in the data store 316 can be in any data format such as, for example, binary data, comma delimited data, tab delimited data, structured query language (SQL) structures, etc. In some examples, the data store 316 can be accessed via a graphical user interface (GUI) to store constants, thresholds, and/or any other predetermined values.

In some examples, the temperature analyzer circuitry 302 can implement means for analyzing temperatures at the first area 104, 204 and/or the second area 106, 206. For example, the temperature analyzer circuitry 302 can implement means for analyzing or measuring the first temperature of the first area 104, 204 provided by the first temperature sensor 140 and/or the second temperature of the second area 106, 206 provided by the second temperature sensor 142. In some examples, the temperature analyzer circuitry 302 and/or comparator 302 provides means for analyzing a delta temperature by determining a difference between the measured first temperature and the measured second temperature. In some examples, the temperature analyzer circuitry 302 and/or the comparator circuitry 312 provides means for comparing the first temperature and the second temperature and/or means for determining if a temperature difference between the first temperature and the second temperature exceeds a temperature threshold. In some examples, the relative humidity analyzer circuitry 304 can implement means for analyzing or determining relative humidity of an area of the industrial facility 100. For example, the relative humidity analyzer circuitry 304 can implement means for detecting, measuring or determining a first relative humidity of the first area 104, 204 provided by the first relative humidity sensor 144 and/or a second relative humidity of the second area 106, 206 provided by the second relative humidity sensor 146. In some examples, the dewpoint determiner circuitry 306 provides means for calculating a dewpoint of the first area 104, 204 and/or the second area 106, 206. For example, the dewpoint determiner circuitry 306 provides means for detecting or measuring a first dewpoint of the first area 104, 204 (e.g., based on the measured first temperature and the first relative humidity) and a second dewpoint of the second area 106, 206 (e.g., based on the measured second temperature and the second relative humidity). In some examples, the dewpoint determiner circuitry 306 and/or the comparator circuitry 312 provides means for comparing or determining if the first dewpoint is less than the second temperature. In some examples, the surface temperature determiner circuitry 308 provides means for determining or calculating a surface temperature of a surface of the industrial facility 100. For example, the surface temperature determiner circuitry 308 provides means for calculating the surface temperature of the surface 124 of the door 112 (e.g., based on the measured first temperature, the measured second temperature, and one or more constant values). In some examples, the fan manager circuitry 310 provides means for controlling an operation of the fan 132. In some examples, the fan manager circuitry 310 provides means for deactivating and/or activating the fan 132 located in the first area 204. In some examples, the temperature analyzer circuitry 302 provides means for determining a delta temperature corresponding to an absolute difference between the first temperature and the second temperature, provides means for determining one or more door constants, provides means for calculating an adjustment temperature based on the delta temperature and the one or more door constants and/or provides means for calculating the surface temperature by subtracting or identifying a difference between the adjustment temperature from the second temperature.

While an example manner of implementing the fan controller 126 of FIGS. 1 and/or 2 is illustrated in FIG. 3, one or more of the elements, processes and/or devices illustrated in FIG. 3 may be combined, divided, re-arranged, omitted, eliminated and/or implemented in any other way. Further, the example temperature analyzer circuitry 302, the example relative humidity analyzer circuitry 304, the example dewpoint determiner circuitry 306, the example surface temperature determiner circuitry 308, the example fan manager circuitry 310, the example comparator circuitry 312, the example data store 316 and/or, more generally, the example fan controller 126 of FIG. 3 may be implemented by hardware alone or by hardware in combination with software and/or firmware. Thus, for example, any of the example temperature analyzer circuitry 302, the example relative humidity analyzer circuitry 304, the example dewpoint determiner circuitry 306, the example surface temperature determiner circuitry 308, the example fan manager circuitry 310, the example comparator circuitry 312, the example data store 316 and/or, more generally, the example fan controller 126 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example fan controller 126 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples, the fan controller 126 includes means for analyzing temperatures. For example, the means for analyzing temperatures may be implemented by temperature analyzer circuitry 302. In some examples, the temperature analyzer circuitry 302 may be instantiated by processor circuitry such as the example processor circuitry 812 of FIG. 8. For instance, the temperature analyzer circuitry 302 may be instantiated by the example microprocessor 900 of FIG. 9 executing machine executable instructions such as those implemented by at least blocks 406, 408, 410 of FIG. 4. In some examples, the temperature analyzer circuitry 302 may be instantiated by hardware logic circuitry, which may be implemented by an ASIC, XPU, or the FPGA circuitry 1000 of FIG. 10 structured to perform operations corresponding to the machine readable instructions. Additionally or alternatively, the temperature analyzer circuitry 302 may be instantiated by any other combination of hardware, software, and/or firmware. For example, the temperature analyzer circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the fan controller 126 includes means for analyzing or determining relative humidity. For example, the means for analyzing or determining relative humidity may be implemented by relative humidity analyzer circuitry 304. In some examples, the relative humidity analyzer circuitry 304 may be instantiated by processor circuitry such as the example processor circuitry 812 of FIG. 8. For instance, the relative humidity analyzer circuitry 304 may be instantiated by the example microprocessor 900 of FIG. 9 executing machine executable instructions such as those implemented by at least blocks 406, 408 of FIG. 4. In some examples, the relative humidity analyzer circuitry 304 may be instantiated by hardware logic circuitry, which may be implemented by an ASIC, XPU, or the FPGA circuitry 1000 of FIG. 10 structured to perform operations corresponding to the machine readable instructions. Additionally or alternatively, the relative humidity analyzer circuitry 304 may be instantiated by any other combination of hardware, software, and/or firmware. For example, the relative humidity analyzer circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the fan controller 126 includes means for determining or calculating dewpoint. For example, the means for determining or calculating dewpoint may be implemented by dewpoint determiner circuitry 306. In some examples, the dewpoint determiner circuitry 306 may be instantiated by processor circuitry such as the example processor circuitry 812 of FIG. 8. For instance, the dewpoint determiner circuitry 306 may be instantiated by the example microprocessor 900 of FIG. 9 executing machine executable instructions such as those implemented by at least block 416 of FIG. 4, blocks 502, 504, 506, 508, 510, 512 of FIG. 5, and blocks 602, 604, 606, 608, 610, 612 of FIG. 6. In some examples, the dewpoint determiner circuitry 306 may be instantiated by hardware logic circuitry, which may be implemented by an ASIC, XPU, or the FPGA circuitry 1000 of FIG. 10 structured to perform operations corresponding to the machine readable instructions. Additionally or alternatively, the dewpoint determiner circuitry 306 may be instantiated by any other combination of hardware, software, and/or firmware. For example, the dewpoint determiner circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the fan controller 126 includes means for determining or calculating a surface temperature. For example, the means for determining or calculating a surface temperature may be implemented by surface temperature determiner circuitry 308. In some examples, the surface temperature determiner circuitry 308 may be instantiated by processor circuitry such as the example processor circuitry 812 of FIG. 8. For instance, the surface temperature determiner circuitry 308 may be instantiated by the example microprocessor 900 of FIG. 9 executing machine executable instructions such as those implemented by at least block 424 of FIG. 4, and blocks 702, 704, 706, 708, 710 of FIG. 7. In some examples, the surface temperature determiner circuitry 308 may be instantiated by hardware logic circuitry, which may be implemented by an ASIC, XPU, or the FPGA circuitry 1000 of FIG. 10 structured to perform operations corresponding to the machine readable instructions. Additionally or alternatively, the surface temperature determiner circuitry 308 may be instantiated by any other combination of hardware, software, and/or firmware. For example, the surface temperature determiner circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the fan controller 126 includes means for controlling an operation of the fan 132. For example, the means for controlling an operation of the fan 132 may be implemented by fan manager circuitry 310. In some examples, the fan manager circuitry 310 may be instantiated by processor circuitry such as the example processor circuitry 812 of FIG. 8. For instance, the fan manager circuitry 310 may be instantiated by the example microprocessor 900 of FIG. 9 executing machine executable instructions such as those implemented by at least blocks 426, 428 of FIG. 4. In some examples, the fan manager circuitry 310 may be instantiated by hardware logic circuitry, which may be implemented by an ASIC, XPU, or the FPGA circuitry 1000 of FIG. 10 structured to perform operations corresponding to the machine readable instructions. Additionally or alternatively, the fan manager circuitry 310 may be instantiated by any other combination of hardware, software, and/or firmware. For example, the fan manager circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the fan controller 126 includes means for comparing dewpoints and temperatures. For example, the means for comparing dewpoints and temperatures may be implemented by comparator circuitry 312. In some examples, the comparator circuitry 312 may be instantiated by processor circuitry such as the example processor circuitry 812 of FIG. 8. For instance, the comparator circuitry 312 may be instantiated by the example microprocessor 900 of FIG. 9 executing machine executable instructions such as those implemented by at least block 508 of FIG. 5, and block 608 of FIG. 6. In some examples, the comparator circuitry 312 may be instantiated by hardware logic circuitry, which may be implemented by an ASIC, XPU, or the FPGA circuitry 1000 of FIG. 10 structured to perform operations corresponding to the machine readable instructions. Additionally or alternatively, the comparator circuitry 312 may be instantiated by any other combination of hardware, software, and/or firmware. For example, the comparator circuitry 312 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Flowcharts representative of example hardware logic circuitry, machine readable instructions, hardware implemented state machines, and/or any combination thereof for implementing the fan controller 126 of FIG. 3 are shown in FIGS. 4-7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program can be embodied in software stored on one or more non-transitory computer readable storage media such as a compact disk (CD), a floppy disk, a hard disk drive (HDD), a solid-state drive (SDD), a digital versatile disk (DVD), a Blu-ray disk, or a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with the processor circuitry, but the entire program and/or parts thereof could alternatively be executed by one or more hardware devices other than the processor circuitry 812 and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4-7, many other methods of implementing the example fan controller 126 may alternatively be used. For example, the order of execution of the blocks may be changed, and/or some of the blocks described may be changed, eliminated, or combined. Additionally or alternatively, any or all of the blocks can be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry can be distributed in different network locations and/or local to one or more hardware devices (e.g., a single-core processor (e.g., a single core central processor unit (CPU)), a multi-core processor in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein can be stored in one or more of a compressed format, an encrypted format, a fragmented format, a compiled format, an executable format, a packaged format, etc. Machine readable instructions as described herein can be stored as data or a data structure (e.g., as portions of instructions, code, representations of code, etc.) that can be utilized to create, manufacture, and/or produce machine executable instructions. For example, the machine readable instructions can be fragmented and stored on one or more storage devices and/or computing devices (e.g., servers) located at the same or different locations of a network or collection of networks (e.g., in the cloud, in edge devices, etc.). The machine readable instructions can require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions can be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions can be stored in a state in which they can be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, can include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 4-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
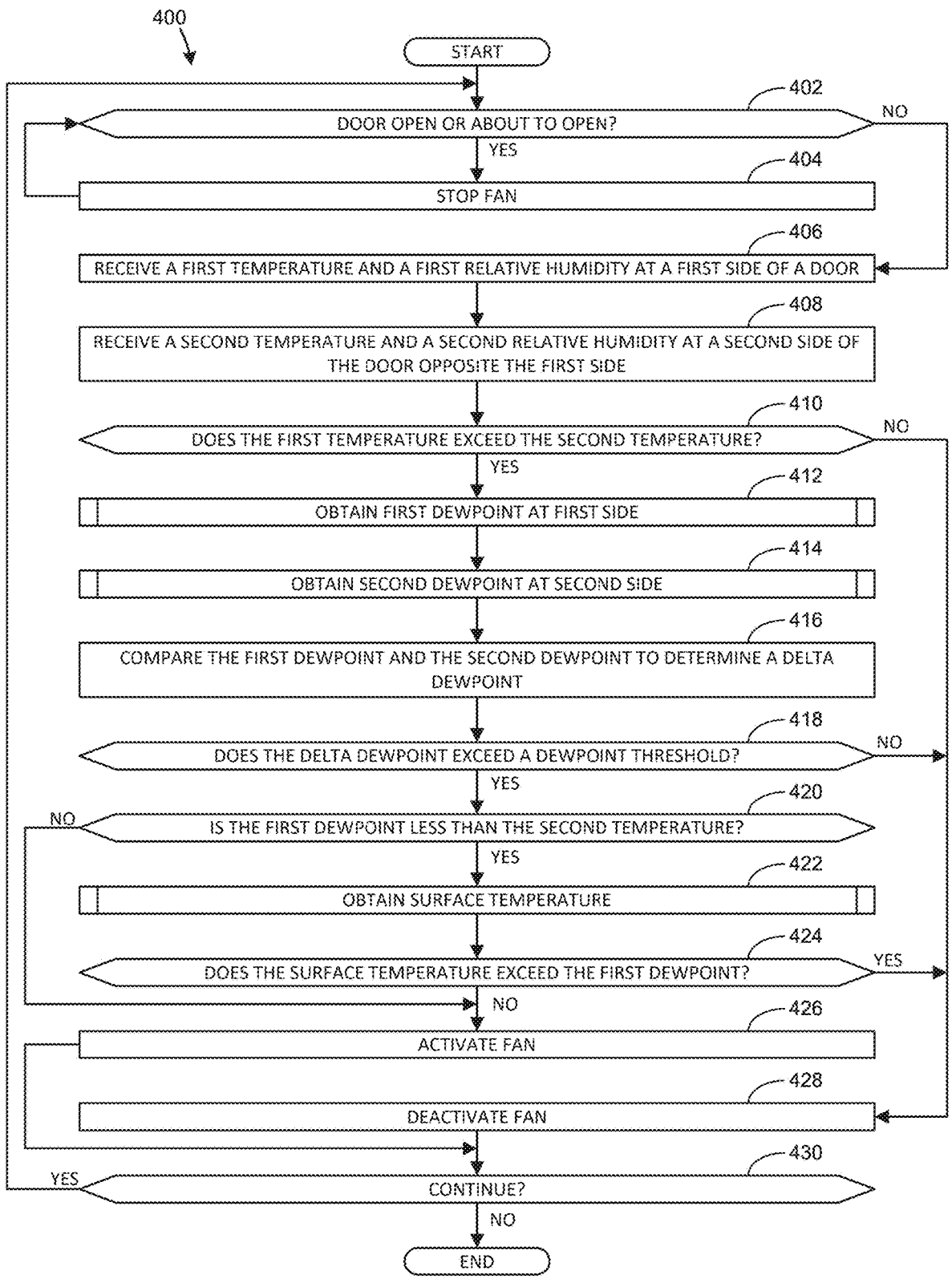
FIGS. 4-7 are flowcharts representative of example machine readable instructions and/or example operations for implementing the example fan controller of FIG. 3 to analyze environmental data and operate an example fan of the example monitoring systems of FIGS. 1 and/or 2.

The example machine readable instructions and/or example operations 400 of FIG. 4 begins when the fan controller 126 determines whether the door 112 is open or about to open (block 402). For example, the fan manager circuitry 310 makes this determination based on a status signal (e.g., the status signal 152) provided by the door controller 150 and/or a separate sensor associated with the door 112. In response to the fan controller 126 determining that the door 112 is open or about to open, the fan controller 126 stops the fan 132 (block 404). In some examples, the fan manager circuitry 310 stops the fan 132 by deactivating the fan 132. In some examples, the fan manager circuitry 310 stops the fan 132 by activating a brake associated with the fan 132. In some situations, the fan 132 may already be stopped such that no action is taken at block 404. Thereafter, control returns to block 402 to continue to monitor whether the door is open or about to open (or closed). In this manner, so long as the door 112 is open, the fan 132 will remained stopped. In some examples, block 402, 404 are omitted.

In response to the fan controller 126 determining (at block 402) that the door 112 is not open and not about to open (e.g., the door 112 is closed), control advances to block 406 where the fan controller 126 receives a first temperature and a first relative humidity at the first side of the door 112. For example, the temperature analyzer circuitry 302 receives the first temperature (e.g. the feedback signal 140a) from the first temperature sensor 140 of the first area 104, 204 and the relative humidity analyzer circuitry 304 receives the first relative humidity (e.g. the feedback signal 144a) from the first relative humidity sensor 144 of the first area 104, 204.

The fan controller 126 receives a second temperature and a second relative humidity at the second side of the door 112

(block 408). For example, the temperature analyzer circuitry 302 receives the second temperature (e.g. the feedback signal 142a) from the second temperature sensor 142 of the second area 106, 206 and the relative humidity analyzer circuitry 304 receives second relative humidity (e.g. the feedback signal 146a) from the second relative humidity sensor 146 of the second area 106, 206. In some examples, the fan controller 126 receives a feedback signal from a third-party application via a network that is representative of the second dewpoint of the second area 206. As noted above, in some examples in which the second temperature of the second area 106 does not exceed a predefined temperature value, relative humidity analyzer circuitry 304 obtains, retrieves and/or otherwise receives an estimated relative humidity value from, for example, the data store 316.

After receiving the first temperature and the second temperature, the fan controller 126 determines if the first temperature exceeds the second temperature (block 410). For example, the temperature analyzer circuitry 302 compares the first temperature and the second temperature via the comparator circuitry 312 to determine if the first temperature is greater than (e.g., exceeds) the second temperature or determine if the first temperature is less than or equal to (e.g., does not exceed) the second temperature.

In response to the fan controller 126 determining that the first temperature exceeds the second temperature at block 408, the fan controller 126 obtains the first dewpoint (block 412). Further detail regarding the implementation of block 412 is provided below in connection with FIG. 5. Thereafter, control advances to block 414. Alternatively, in some examples, the fan controller 126 receives a feedback signal representative of the first dewpoint from a first dewpoint sensor located at the first area 104, 204.

Likewise, the fan controller 126 obtains the second dewpoint (block 414). Further detail regarding the implementation of block 414 is provided below in connection with FIG. 6. Thereafter, control advances to block 416. Alternatively, in some examples, the fan controller 126 receives a feedback signal representative of the second dewpoint from a second dewpoint sensor located at the second area 106, 206. In some examples, the fan controller 126 receives a feedback signal from a third-party application via a network that is representative of the second dewpoint of the second area 206.

The fan controller 126 compares the first dewpoint and the second dewpoint to determine a delta dewpoint value (block 416). For example, the dewpoint determiner circuitry 306 compares the first dewpoint obtained at block 408 and the second dewpoint obtained at block 410 via the comparator circuitry 312 and determines a difference between the first dewpoint and the second dewpoint to obtain the delta dewpoint. For example, the delta dewpoint may be an absolute value of the difference between the first dewpoint and the second dewpoint.

The fan controller 126 then determines whether the delta dewpoint exceeds a dewpoint threshold (block 418). For example, the fan controller 126 retrieves the dewpoint threshold from the data store 316 and compares the delta dewpoint and the dewpoint threshold. For example, the dewpoint threshold may be a zero. In some examples, the dewpoint threshold may be a value greater than zero (e.g., a whole number (e.g., 1, 2, 5, etc.), a fraction (0.2, 0.75, etc.), etc.).

If the fan controller 126 determines that the delta dewpoint exceeds the dewpoint threshold, the fan controller 126 determines if the first dewpoint of the first area 104, 204 is less than the second temperature of the second area 106, 206 (block 420). For example, the fan controller 126 compares the first dewpoint and the second temperature via the comparator circuitry 312.

If at block 420 the fan controller 126 determines that the first dewpoint is less than the second temperature, the fan controller 126 obtains a surface temperature of the door 112 (block 422). Further detail regarding the implementation of block 422 is provided below in connection with FIG. 7. Thereafter, control advances to block 424. In some examples, the fan controller 126 receives a signal (e.g., the feedback signal 148a) representative of the surface temperature of the door 112 from a surface temperature sensor 148 located at the first area 104, 204.

After obtaining the surface temperature at block 422, the fan controller 126 determines if the surface temperature exceeds the first dewpoint temperature (block 424). For example, the surface temperature determiner circuitry 308 compares, via the comparator circuitry 312, the surface temperature and the first dewpoint provided by the dewpoint determiner circuitry 306. The surface temperature determiner circuitry 308 determines that the surface temperature does not exceed the first dewpoint when the fan controller 126 determines that the surface temperature of the door 112 is less than or equal to the first dewpoint. The fan controller 126 determines that the surface temperature exceeds the first dewpoint when the fan controller 126 determines that the surface temperature of the door 112 is greater than the first dewpoint.

At block 424, if the fan controller 126 determines that the surface temperature does not exceed the first dewpoint, the fan manager circuitry 310 activates the fan 132 (block 424).

Returning to block 420, if at block 420 the fan controller 126 determines that the first dewpoint is not less than the second temperature (e.g., the first dewpoint is greater than or equal to the second temperature), the control proceeds to block 426 and the fan controller 126 activates the fan 132. For example, the fan manager circuitry 310 initiates a command (e.g., the output signal 138) to activate (e.g., turn on) the fan 132. For example, the output signal 138 may provide current or electrical power to the motor 134. The control returns to block 430.

Returning to block 410, in response to the fan controller 126 determining that the first temperature does not exceed the second temperature at block 410, the fan controller 126 deactivates the fan 132 (block 428). For example, if the temperature analyzer circuitry 302 determines that the first temperature is less than or equal to the second temperature, the fan manager circuitry 310 commands the motor 134 (e.g., via the output signal 138) to turn off or deactivate. For example, the output signal 138 may remove current or electrical power to the motor 134. The control then returns to block 430.

Returning to block 418, if at block 418 the fan controller 126 determines that the delta dewpoint does not exceed the dewpoint threshold, the program returns to block 428 where the fan controller 126 and/or the fan manager circuitry 310 commands the fan 132 to deactivate. The control then returns to block 430.

Returning to block 424, if at block 424 the fan controller 126 determines that the surface temperature exceeds (e.g., is greater than) the first dewpoint, the program returns to block 428 and the fan manager circuitry 310 commands the fan to deactivate. The control then returns to block 430.

At block 430, the program 400 determines whether to continue. If so, control returns to block 406. If not, the example program 400 of FIG. 4 ends.

Figure 5:
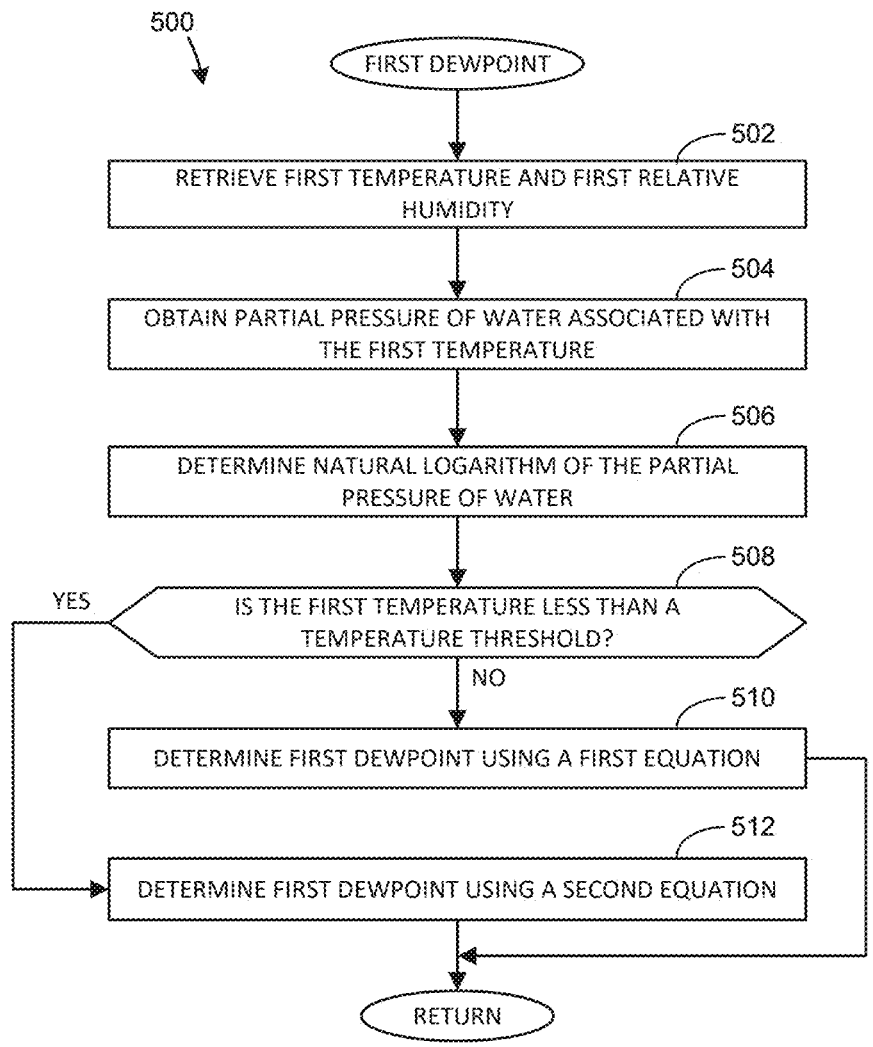

FIG. 5 is a flowchart illustrating an example implementation of block 412 of FIG. 4. The example machine readable instructions and/or example operations 500 of FIG. 5 begins at block 502 where the dewpoint determiner circuitry 306 retrieves the first temperature and the first relative humidity (block 502). For example, the dewpoint determiner circuitry 306 retrieves or receives the first temperature from the temperature analyzer circuitry 302 and the first relative humidity from the relative humidity analyzer circuitry 304. The dewpoint determiner circuitry 306 obtains the partial pressure of water associated with the first temperature (block 504). For example, the dewpoint determiner circuitry 306 retrieves the saturation vapor pressure from the data store 316 (e.g., a look-up table) associated with the first temperature. The dewpoint determiner circuitry 306 employs the relative humidity and the saturation vapor pressure associated with the first temperature to calculate the partial pressure of water (see e.g., equation (EQ4) noted above). The dewpoint determiner circuitry 306 then determines the natural logarithm of the partial pressure of water (block 506). For example, the dewpoint determiner circuitry 306 employs the example equation (EQ3) noted above to determine the natural logarithm of the partial pressure of water. The dewpoint determiner circuitry 306 determines if the first temperature is less than a temperature threshold (block 508). For example, the dewpoint determiner circuitry 306 retrieves the temperature threshold from the data store 316 and employs the comparator circuitry 312 to compare the first temperature and the temperature threshold.

At block 508, if the dewpoint determiner circuitry 306 determines that first temperature is not less than the temperature threshold, the dewpoint determiner circuitry 306 determines the first dewpoint based on a first equation (block 510). For example, the dewpoint determiner circuitry 306 retrieves constants (e.g., $C_{14}$-$C_{18}$ of equation (EQ1) noted above) from the data store 316 and uses the constants, the partial pressure of water and the natural logarithm of the partial pressure of water to determine the first dewpoint (see equation (EQ1) noted above). Thereafter, the example program 500 of FIG. 5 returns.

Returning to block 508, if the dewpoint determiner circuitry 306 determines that first temperature is less than the temperature threshold, the dewpoint determiner circuitry 306 determines the first dewpoint based on a second equation (block 512). For example, the dewpoint determiner circuitry 306 determines the first dewpoint based on the natural logarithm of the partial pressure of water (see equation (EQ2) above). Thereafter, the example program 500 of FIG. 5 returns.

Figure 6:
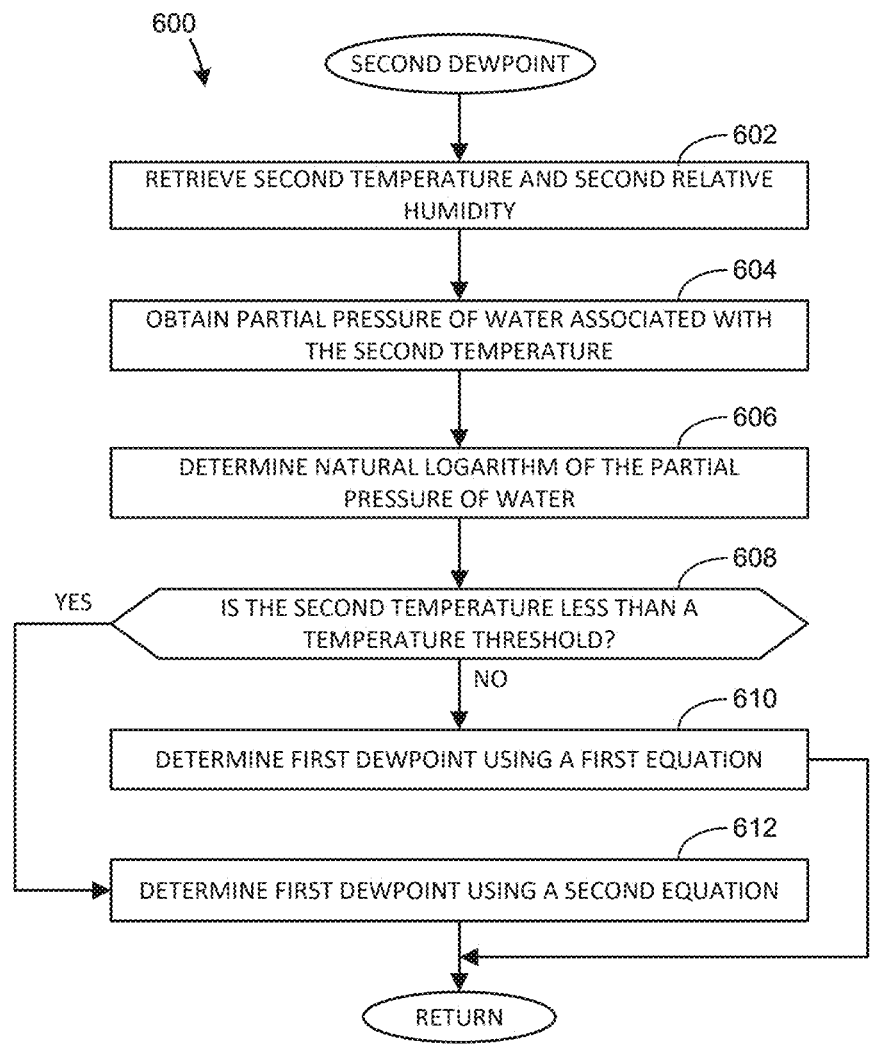

FIG. 6 is a flowchart illustrating an example implementation of block 414 of FIG. 4. The example machine readable instructions and/or example operations 600 of FIG. 6 begins at block 602 where the dewpoint determiner circuitry 306 retrieves the second temperature and the second relative humidity (block 602). For example, the dewpoint determiner circuitry 306 retrieves or receives the second temperature from the temperature analyzer circuitry 302 and the second relative humidity from the relative humidity analyzer circuitry 304. The dewpoint determiner circuitry 306 obtains the partial pressure of water associated with the second temperature (block 604). For example, the dewpoint determiner circuitry 306 retrieves the saturation vapor pressure from the data store 316 (e.g., a look-up table) associated with the second temperature. The dewpoint determiner circuitry 306 employs the relative humidity and the saturation vapor pressure associated with the second temperature to calculate the partial pressure of water (see e.g., equation (EQ4) noted above). The dewpoint determiner circuitry 306 then determines the natural logarithm of the partial pressure of water (block 606). For example, the dewpoint determiner circuitry 306 employs the example equation (EQ3) noted above to determine the natural logarithm of the partial pressure of water. The dewpoint determiner circuitry 306 determines if the second temperature is less than a temperature threshold (block 608). For example, the dewpoint determiner circuitry 306 retrieves the temperature threshold from the data store 316 and employs the comparator circuitry 312 to compare the second temperature and the temperature threshold.

At block 608, if the dewpoint determiner circuitry 306 determines that second temperature is not less than the temperature threshold, the dewpoint determiner circuitry 306 determines the second dewpoint based on a first equation (block 610). For example, the dewpoint determiner circuitry 306 retrieves constants (e.g., $C_{14}$-$C_{18}$ of equation (EQ1) noted above) from the data store 316 and uses the constants, the partial pressure of water and the natural logarithm of the partial pressure of water to determine the second dewpoint (see equation (EQ1) noted above). Thereafter, the example program 600 of FIG. 6 returns.

Returning to block 608, if the dewpoint determiner circuitry 306 determines that second temperature is less than the temperature threshold, the dewpoint determiner circuitry 306 determines the second dewpoint based on a second equation (block 612). For example, the dewpoint determiner circuitry 306 determines the second dewpoint based on the natural logarithm of the partial pressure of water (see equation (EQ2) above). Thereafter, the example program 600 of FIG. 6 returns.

Figure 7:
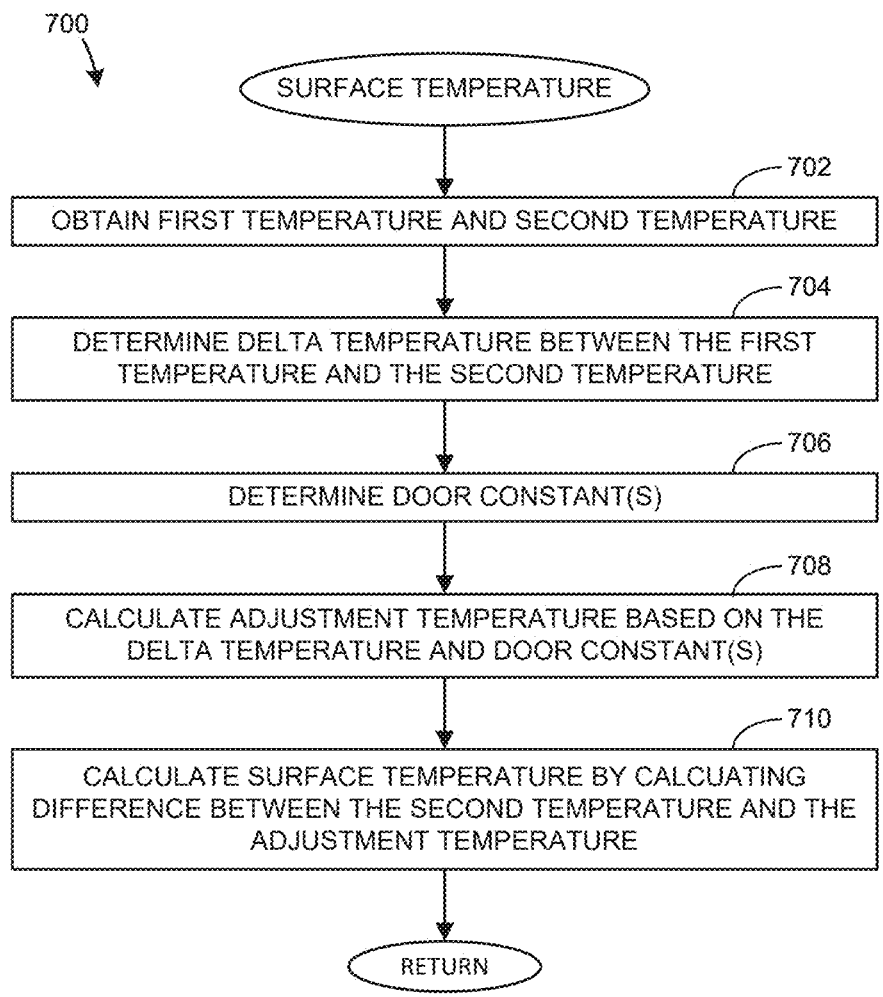

FIG. 7 is a flowchart illustrating an example implementation of block 422 of FIG. 4. The example machine readable instructions and/or example operations 700 of FIG. 7 begins at block 702 where the surface temperature determiner circuitry 308 obtains the first temperature and the second temperature. For example, the surface temperature determiner circuitry 308 retrieves or receives the first temperature and the second temperature from the temperature analyzer circuitry 302. The surface temperature determiner circuitry 308 determines a delta temperature between the first temperature and the second temperature (block 704). For example, to determine the delta temperature, the surface temperature determiner circuitry 308 calculates an absolute value of a difference between the first temperature and the second temperature. The surface temperature determiner circuitry 308 then determines door constant(s) (block 706). For example, surface temperature determiner circuitry 308 retrieves the door constant(s) (e.g., the $m_{door}$ and the $b_{door}$ based on an R-value and other characteristics of the door 112) from the data store 316. The surface temperature determiner circuitry 308 then calculates an adjustment temperature (adjustment) based on the delta temperature and the door constant(s) (block 708). The surface temperature determiner circuitry 308 then calculates the surface temperature by calculating the difference between the second temperature and the adjustment temperature (block 710). For example, the surface temperature determiner circuitry 308 employs equations (EQ5-EQ8) noted above. Thereafter, the example program 700 of FIG. 7 returns.

Figure 8:
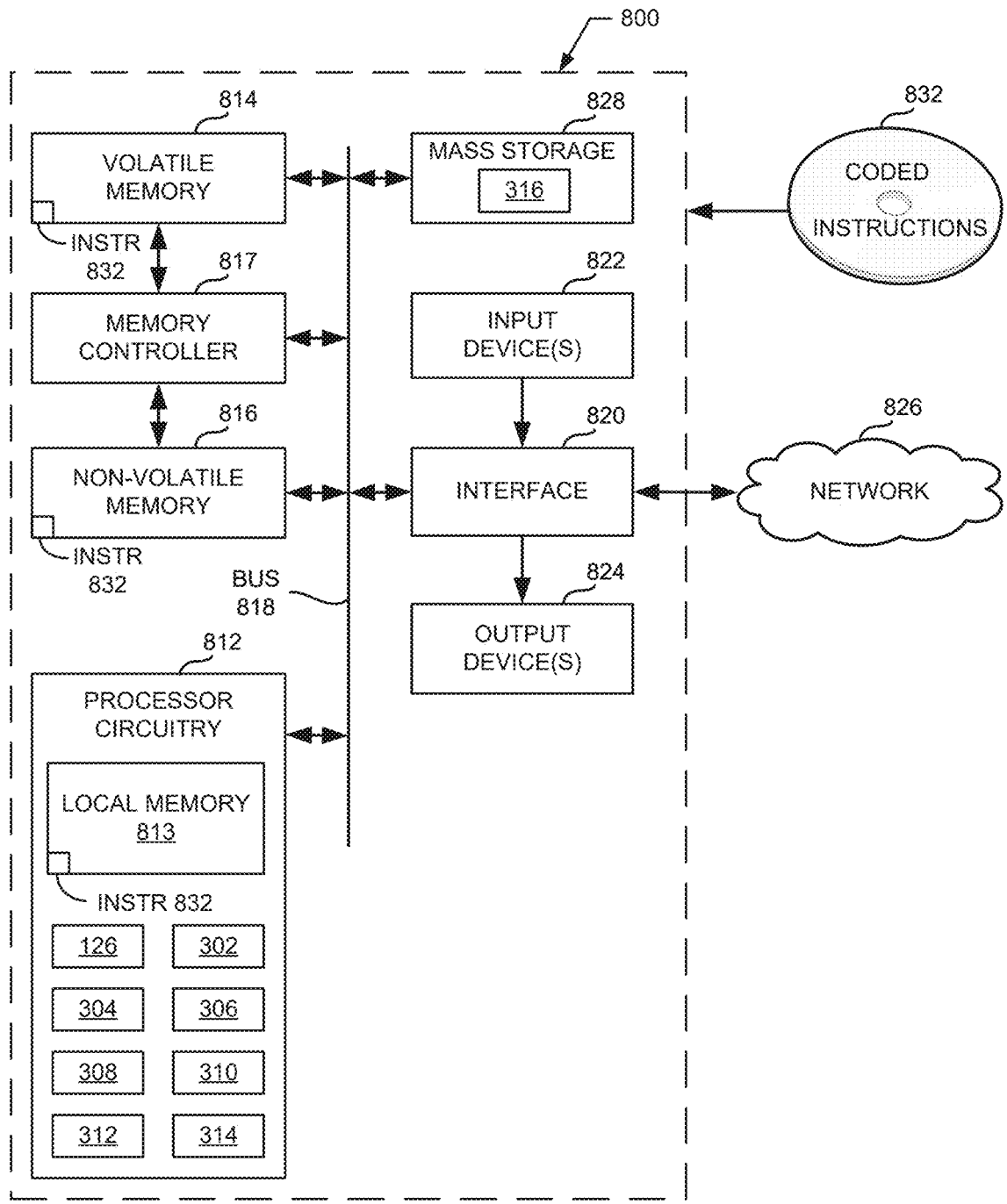
FIG. 8 is a block diagram of an example processing platform including processor circuitry structured to execute the example machine readable instructions and/or the example operations of FIGS. 4-7 to implement the example fan controller of FIG. 3.

FIG. 8 is a block diagram of an example processor platform 800 structured to execute and/or instantiate the machine readable instructions and/or the operations of FIGS. 4-7 to implement the fan controller 126 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example temperature analyzer circuitry 302, the example relative humidity analyzer circuitry 304, the example dewpoint determiner circuitry 306, the example surface temperature determiner circuitry 308, the example fan manager circuitry 310, the example comparator circuitry 312, the example data store 316 and/or, more generally, the example fan controller 126.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of RAM device. The non-volatile memory 816 may be implemented by flash memory and/or any other desired type of memory device. Access to the main memory 814, 816 is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.). The interface circuitry 820 of the illustrated example, thus, typically includes a graphics driver card, a graphics driver chip and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the machine readable instructions of FIGS. 4-7 may be stored in the mass storage device 828, in the volatile memory 814, in the non-volatile memory 816, and/or on a removable non-transitory computer readable storage medium such as a CD or DVD.

Figure 9:
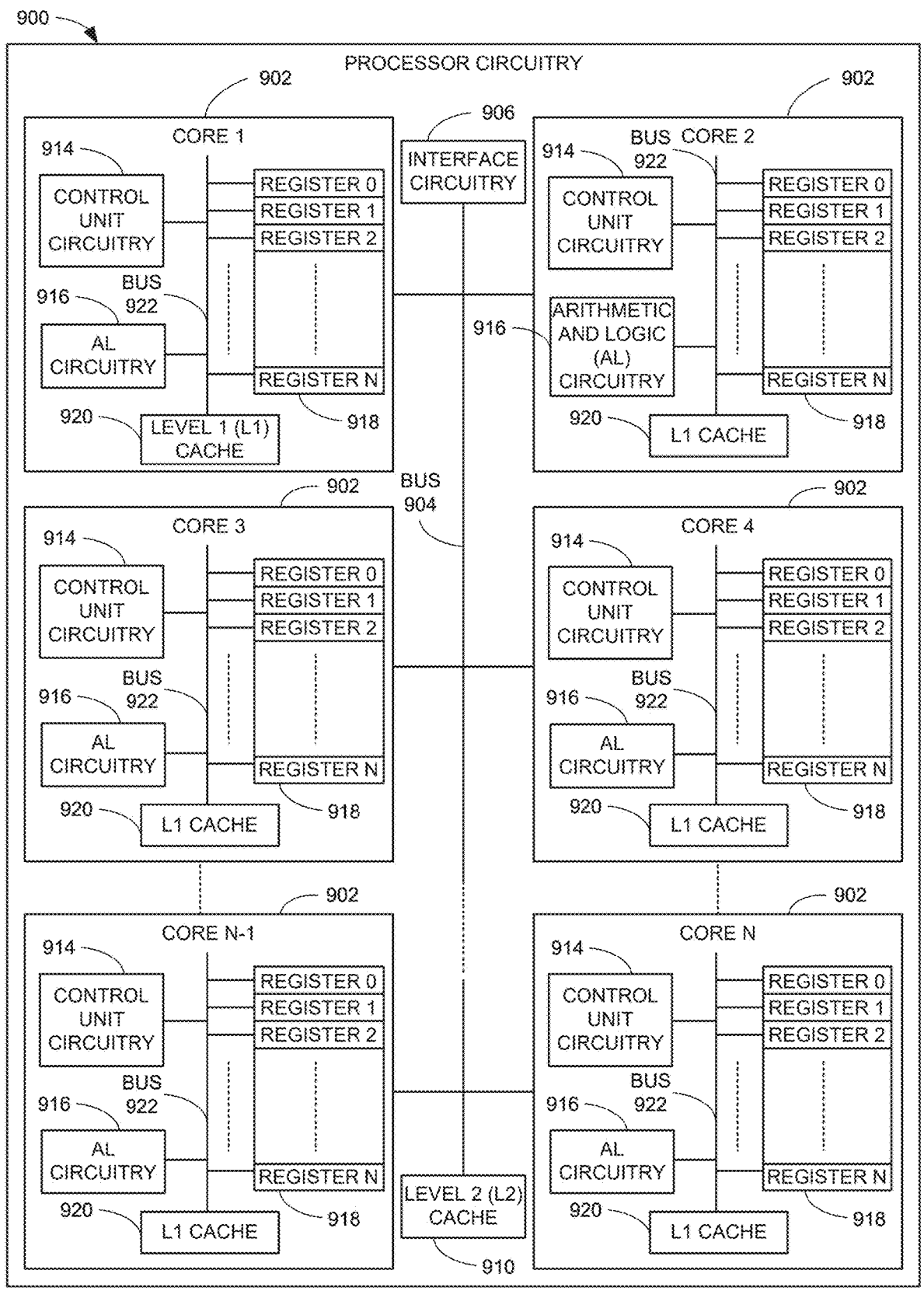
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general purpose microprocessor (e.g., general purpose microprocessor circuitry). The microprocessor 900 executes some or all of the machine readable instructions of the flowcharts of FIGS. 4-7 to effectively instantiate the circuitry of FIG. 3 as logic circuits to perform the operations corresponding to those machine readable instructions. In some such examples, the circuitry of FIG. 3 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 4-7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions.

Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
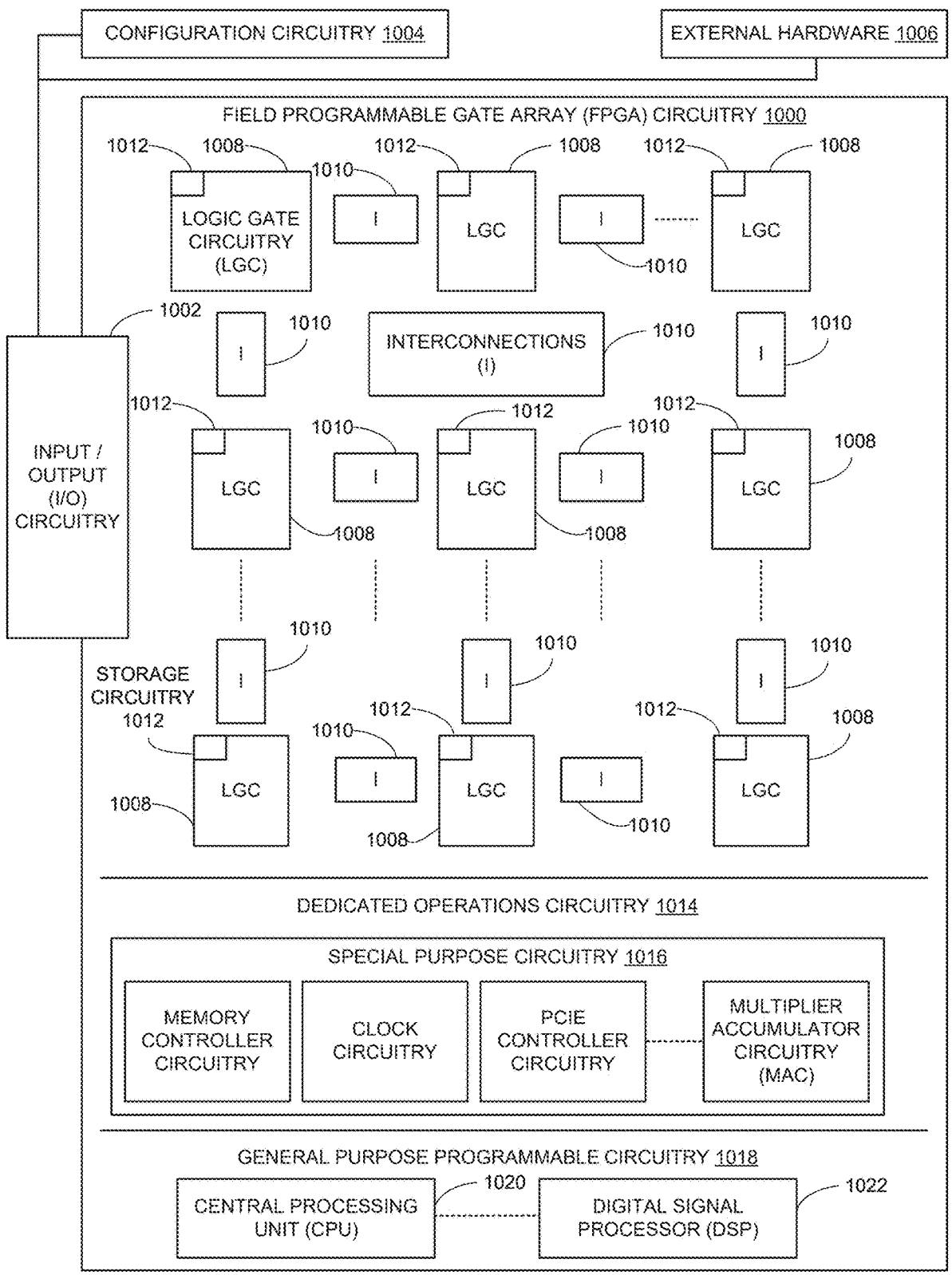
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 4-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 4-7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 4-7. As such, the FPGA circuitry 1000 may be structured to effectively instantiate some or all of the machine readable instructions of the flowcharts of FIGS. 4-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 4-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIGS. 4-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an onboard CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 4-7 may be executed by one or more of the cores 902 of FIG. 9, a second portion of the machine readable instructions represented by the flowcharts of FIGS. 4-7 may be executed by the FPGA circuitry 1000 of FIG. 10, and/or a third portion of the machine readable instructions represented by the flowcharts of FIGS. 4-7 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
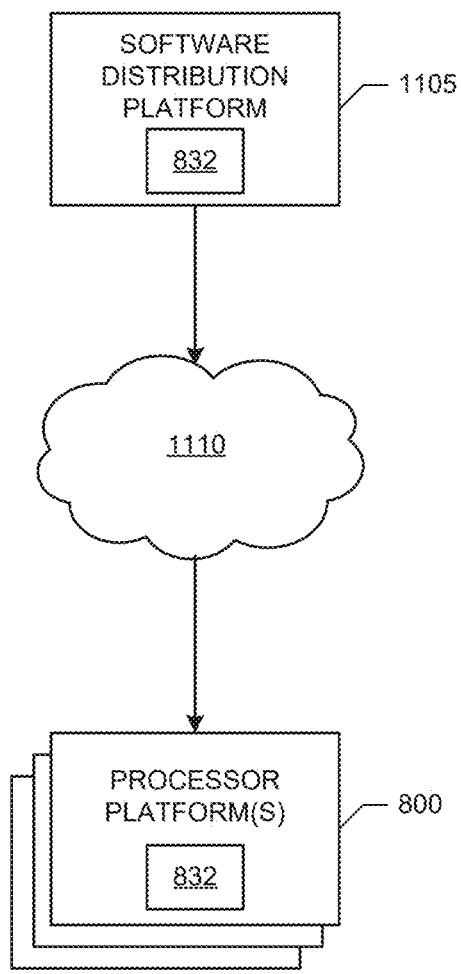
FIG. 11 is a block diagram of an example software distribution platform (e.g., one or more servers) to distribute software (e.g., software corresponding to the example machine readable instructions of FIGS. 4-7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions of FIGS. 4-7, as described above. The one or more servers of the example software distribution platform 1105 are in communication with an example network 1110, which may correspond to any one or more of the Internet and/or any of the example networks 826 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions of FIGS. 4-7, may be downloaded to the example processor platform 800, which is to execute the machine readable instructions 832 to implement the fan controller 126. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example methods, apparatus and articles of manufacture have been disclosed that employ control and/or monitoring systems 102, 202 to monitor environmental conditions and determine whether an interior surface (e.g., a door, a wall, a floor, etc.) can be prone to frost and/or condensation when exposed to certain environmental conditions. The disclosed methods, apparatus and articles of manufacture improve the efficiency of using a computing device by operating one or more fans during detected conditions that can cause condensation formation on interior surfaces (e.g., doors, dividers, floors, etc.) and deactivate the one or more fans during detected conditions that may not cause condensation formation on the interior surfaces. Further, examples disclosed herein deactivate or otherwise stop the operation of a fan associated with a door when the door is open or about to open to reduce the forced flow of air between areas on either side of the door. In this manner, example control systems disclosed herein reduce energy waste and/or reduce operating costs. The disclosed methods, apparatus and articles of manufacture are accordingly directed to one or more improvement(s) in the functioning of a computer.

At least some of the aforementioned examples include one or more features and/or benefits including, but not limited to, the following:

In some examples, an example apparatus includes a first sensor to measure a first temperature in a first area and a second sensor to measure a second temperature in a second area adjacent to the first area. The first area separated from the second area by a door. The apparatus having at least one memory, instruction, and processor circuitry. The processor circuitry to execute the instructions to compare the first temperature and the second temperature; determine if a temperature difference between the first temperature and the second temperature exceeds a temperature threshold; and in response to determining that the temperature difference does not exceed the temperature threshold, deactivate a fan located in the first area.

In some examples, the processor circuitry is to: calculate a first dewpoint of the first area and a second dewpoint of the second area; and determine if the first dewpoint is less than the second temperature.

In some examples, the processor circuitry is to deactivate the fan in response to determining that the first dewpoint is less than the second temperature.

In some examples, the processor circuitry is to obtain a surface temperature in response to the first dewpoint not being less than the second temperature.

In some examples, the processor circuitry is to: determine a delta temperature corresponding to an absolute difference between the first temperature and the second temperature; determine one or more door constants; calculate an adjustment temperature based on the delta temperature and the one or more door constants; and calculate the surface temperature by subtracting the adjustment temperature from the second temperature.

In some examples, the processor circuitry is to at least one of: deactivate the fan in response to determining that the surface temperature is greater than the first dewpoint; and activate the fan in response to determining that the surface temperature is not greater than the first dewpoint.

In some examples, in response to a signal indicating the door is open or about to open, the processor circuitry is to stop the fan.

In some examples, the processor circuitry is to stop the fan by deactivating the fan.

In some examples, the processor circuitry is to stop the fan by activating a brake associated with the fan.

In some examples, a non-transitory computer readable medium includes instructions that, when executed, cause at least one processor to at least: compare a first temperature measured in a first area and a second temperature measured in a second area adjacent the first area, the first area and the second area separated by a door; determine if a temperature difference between the first temperature and the second temperature exceeds a temperature threshold; and in response to determining that the temperature difference does not exceed the temperature threshold, deactivate a fan located in the first area.

In some examples, the instructions are further to cause the at least one processor to obtain a first relative humidity at the first area and obtain a second relative humidity at the second area.

In some examples, the instructions are further to cause the at least one processor to calculate a first dewpoint of the first area and a second dewpoint of the second area; and determine if the first dewpoint is less than the second temperature.

In some examples, the instructions are further to cause the at least one processor to deactivate the fan in response to determining that the first dewpoint is less than the second temperature.

In some examples, the instructions are further to cause the at least one processor to obtain a surface temperature in response to the first dewpoint not being less than the second temperature.

In some examples, the instructions are further to cause the at least one processor to: determine a delta temperature corresponding to an absolute difference between the first temperature and the second temperature; determine one or more door constants; calculate an adjustment temperature based on the delta temperature and the one or more door constants; and calculate the surface temperature by subtracting the adjustment temperature from the second temperature.

In some examples, the instructions are further to cause the at least one processor to at least one of: deactivate the fan in response to determining that the surface temperature is greater than the first dewpoint; and activate the fan in response to determining that the surface temperature is not greater than the first dewpoint.

In some examples, in response to a signal indicating the door is open or about to open, the instructions cause the at least one processor to stop the fan by at least one of deactivating the fan or activating a brake associated with the fan.

In some examples, a method includes: comparing a first temperature measured in a first area and a second temperature measured in a second area adjacent the first area, the first area and the second area separated by a door; determining if a temperature difference between the first temperature and the second temperature exceeds a temperature threshold; and in response to determining that the temperature difference does not exceed the temperature threshold, deactivating a fan located in the first area.

In some examples, the method includes obtaining a first relative humidity at the first area and obtain a second relative humidity at the second area In some examples, the method includes calculating a first dewpoint at the first area and a second dewpoint at the second area; and determining if the first dewpoint is less than the second temperature.

In some examples, the method includes deactivating the fan in response to determining that the first dewpoint is less than the second temperature.

In some examples, the method includes obtaining a surface temperature in response to the first dewpoint not being less than the second temperature.

In some examples, the method includes determining a delta temperature corresponding to an absolute difference between the first temperature and the second temperature;

determining one or more door constants; calculating an adjustment temperature based on the delta temperature and the one or more door constants; and calculating the door temperature by subtracting the adjustment temperature from the second temperature.

In some examples, the method further includes at least one of: deactivating the fan in response to determining that the surface temperature is greater than the first dewpoint; and activating the fan in response to determining that the surface temperature is not greater than the first dewpoint.

In some examples, the method further includes, in response to a signal indicating the door is open or about to open, stopping the fan by at least one of deactivating the fan or activating a brake associated with the fan.

In some examples, an apparatus includes temperature analyzer circuitry to detect a first temperature in a first area and a second temperature in a second area adjacent to the first area, where the first area separated from the second area by a door. The apparatus includes comparator circuitry to compare the first temperature and the second temperature to determine if a temperature difference between the first temperature and the second temperature exceeds a temperature threshold. The apparatus includes fan manager circuitry to deactivate a fan located in the first area in response to determining that the temperature difference does not exceed the temperature threshold.

In some examples, the apparatus includes relative humidity analyzer circuitry to determine a first relative humidity of the first area and a second relative humidity of the second area.

In some examples, dewpoint determiner circuitry calculates a first dewpoint of the first area and a second dewpoint of the second area, and determines if the first dewpoint is less than the second temperature.

In some examples, the fan manager circuitry is to deactivate the fan in response to the dewpoint determiner circuitry determining that the first dewpoint is less than the second temperature.

In some examples, surface temperature determiner circuitry is to obtain a surface temperature of the door in response to the dewpoint determiner circuitry determining that the first dewpoint is not less than the second temperature.

In some examples, the temperature analyzer circuitry is to: determine a delta temperature corresponding to an absolute difference between the first temperature and the second temperature; determine one or more door constants; calculate an adjustment temperature based on the delta temperature and the one or more door constants; and calculate the surface temperature by subtracting the adjustment temperature from the second temperature.

In some examples, the fan manager circuitry is to deactivate the fan in response to the temperature analyzer circuitry determining that the surface temperature is greater than the first dewpoint.

In some examples, the fan manager circuitry is to activate the fan in response to the temperature analyzer circuitry determining that the surface temperature is not greater than the first dewpoint.

In some examples, in response to a signal indicating the door is open or about to open, the fan manager circuitry is to stop the fan by at least one of deactivating the fan or activating a brake associated with the fan.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a first sensor to measure a first temperature in a first area;
a second sensor to measure a second temperature in a second area adjacent to the first area, the first area separated from the second area by a door;
at least one memory;
instructions; and
processor circuitry to execute the instructions to:
compare the first temperature and the second temperature;
determine a delta temperature corresponding to an absolute difference between the first temperature and the second temperature;
determine one or more door constants;
calculate an adjustment temperature based on the delta temperature and the one or more door constants;
calculate a surface temperature of the door by subtracting the adjustment temperature from the second temperature;
determine a first dewpoint of the first area; and
in response to determining that the surface temperature is greater than the first dewpoint, deactivate a fan located in the first area.

2. The apparatus of claim 1, wherein the first sensor is to obtain a first relative humidity of the first area and the second sensor is to obtain a second relative humidity of the second area.

3. The apparatus of claim 2, wherein the processor circuitry is to:
calculate a second dewpoint of the second area; and
determine if the first dewpoint is less than the second temperature.

4. The apparatus of claim 3, wherein the processor circuitry is to deactivate the fan in response to determining that the first dewpoint is less than the second temperature.

5. The apparatus of claim 3, wherein the processor circuitry is to calculate the surface temperature of the door in response to the first dewpoint not being less than the second temperature.

6. The apparatus of claim 1, wherein the processor circuitry is to:
activate the fan in response to determining that the surface temperature is not greater than the first dewpoint.

7. The apparatus of claim 1, wherein, in response to a signal indicating the door is open or about to open, the processor circuitry is to stop the fan.

8. The apparatus of claim 7, wherein the processor circuitry is to stop the fan by deactivating the fan.

9. The apparatus of claim 7, wherein the processor circuitry is to stop the fan by activating a brake associated with the fan.

10. A non-transitory computer readable medium comprising instructions to cause at least one processor to at least:
compare a first temperature measured in a first area and a second temperature measured in a second area adjacent the first area, the first area and the second area being separated by a door;

determine a delta temperature corresponding to an absolute difference between the first temperature and the second temperature;
determine one or more door constants;
calculate an adjustment temperature based on the delta temperature and the one or more door constants;
calculate a surface temperature of the door by subtracting the adjustment temperature from the second temperature;
determine a first dewpoint of the first area; and
in response to determining that the surface temperature is greater than the first dewpoint, deactivate a fan located in the first area.

11. The non-transitory computer readable medium of claim 10, wherein the instructions are further to cause one or more of the at least one processor to obtain a first relative humidity at the first area and obtain a second relative humidity at the second area.

12. The non-transitory computer readable medium of claim 11, wherein the instructions are further to cause one or more of the at least one processor to:
determine a second dewpoint of the second area; and
determine if the first dewpoint is less than the second temperature.

13. The non-transitory computer readable medium of claim 12, wherein the instructions are further to cause one or more of the at least one processor to deactivate the fan in response to determining that the first dewpoint is less than the second temperature.

14. The non-transitory computer readable medium of claim 12, wherein the instructions are further to cause one or more of the at least one processor calculate the surface temperature of the door in response to the first dewpoint not being less than the second temperature.

15. The non-transitory computer readable medium of claim 10, wherein the instructions are further to cause one or more of the at least one processor to activate the fan in response to determining that the surface temperature is not greater than the first dewpoint.

16. The non-transitory computer readable medium of claim 10, wherein, in response to a signal indicating the door is open or about to open, the instructions cause one or more of the at least one processor to stop the fan by at least one of deactivating the fan or activating a brake associated with the fan.

17. A method comprising:
comparing a first temperature measured in a first area and a second temperature measured in a second area adjacent the first area, the first area and the second area separated by a door;
determining a delta temperature corresponding to an absolute difference between the first temperature and the second temperature;
determining one or more door constants;
calculating, by executing instructions with at least one processor circuit, an adjustment temperature based on the delta temperature and the one or more door constants;
calculating, by executing the instructions with one or more of the at least one processor circuit, a surface temperature of the door by subtracting the adjustment temperature from the second temperature;
determining a first dewpoint of the first area; and
in response to determining that the surface temperature is greater than the first dewpoint, deactivating a fan located in the first area.

18. The method of claim 17, further including obtaining a first relative humidity at the first area and obtaining a second relative humidity at the second area.

19. The method of claim 18, further including:
determining a second dewpoint at the second area; and
determining if the first dewpoint is less than the second temperature.

20. The method of claim 19, further including deactivating the fan in response to determining that the first dewpoint is less than the second temperature.

21. The method of claim 19, further including calculating the surface temperature in response to the first dewpoint not being less than the second temperature.

22. The method of claim 17, further including activating the fan in response to determining that the surface temperature is not greater than the first dewpoint.

23. The method of claim 17, further including, in response to a signal indicating the door is open or about to open, stopping the fan by at least one of deactivating the fan or activating a brake associated with the fan.

24. An apparatus comprising:
surface temperature determiner circuitry to;
obtain a first temperature in a first area and a second temperature in a second area adjacent to the first area, the first area separated from the second area by a door;
determine a delta temperature corresponding to an absolute difference between the first temperature and the second temperature;
determine one or more door constants;
calculate an adjustment temperature based on the delta temperature and the one or more door constants; and
calculate a surface temperature by subtracting the adjustment temperature from the second temperature;
dewpoint determiner circuitry to determine a first dewpoint of the first area;
temperature analyzer circuitry determine if the surface temperature is greater than the first dewpoint; and
fan manager circuitry to deactivate a fan located in the first area in response to determination that the surface temperature is greater than the first dewpoint.

25. The apparatus of claim 24, further including relative humidity analyzer circuitry to determine a first relative humidity of the first area and a second relative humidity of the second area.

26. The apparatus of claim 25, wherein the dewpoint determiner circuitry is to:
calculate a second dewpoint of the second area; and
determine if the first dewpoint is less than the second temperature.

27. The apparatus of claim 26, wherein the fan manager circuitry is to deactivate the fan in response to the dewpoint determiner circuitry determining that the first dewpoint is less than the second temperature.

28. The apparatus of claim 26, wherein the surface temperature determiner circuitry is to calculate the surface temperature of the door in response to the dewpoint determiner circuitry determining that the first dewpoint is not less than the second temperature.

29. The apparatus of claim 24, wherein
the fan manager circuitry is to activate the fan in response to the temperature analyzer circuitry determining that the surface temperature is not greater than the first dewpoint.

30. The apparatus of claim 24, wherein, in response to a signal indicating the door is open or about to open, the fan manager circuitry is to stop the fan by at least one of deactivating the fan or activating a brake associated with the fan.

31. The apparatus of claim 1, wherein the processor circuitry is to deactivate the fan in response to determining that a temperature difference between the first temperature and the second temperature does not exceed a temperature threshold.

32. The apparatus of claim 1, wherein at least one of the one or more door constants are based on an insulation rating of the door.

33. The apparatus of claim 1, wherein the one or more door constants include a door temperature slope value and a door intercept value.

34. The apparatus of claim 1, wherein the processor circuitry is to retrieve the one or more door constants from a look-up table.

35. The apparatus of claim 1, wherein the fan is to blow ambient air in the first area toward the door.

* * * * *